United States Patent
Pandey et al.

(10) Patent No.: US 12,399,964 B2
(45) Date of Patent: Aug. 26, 2025

(54) SYSTEM AND METHOD FOR GENERATING A VIRTUAL EXPERIENCE IN A VIRTUAL ENVIRONMENT

(71) Applicant: Bank of America Corporation, Charlotte, NC (US)

(72) Inventors: Anushka Pandey, Chennai (IN); Rajat Singla, Noida (IN); Siva Kesava, Anantapur (IN); Praveen Kumar Parsa, Telangana (IN); Murugan Vasudevan, Coimbatore (IN); Krithika Viswanathan, Chennai (IN); Amit Mishra, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 351 days.

(21) Appl. No.: 18/183,613

(22) Filed: Mar. 14, 2023

(65) Prior Publication Data

US 2024/0311454 A1    Sep. 19, 2024

(51) Int. Cl.
 *G06F 21/31* (2013.01)
 *G06F 21/62* (2013.01)

(52) U.S. Cl.
 CPC ............ *G06F 21/31* (2013.01); *G06F 21/629* (2013.01)

(58) Field of Classification Search
 CPC .............................. G06F 21/31; G06F 21/629
 See application file for complete search history.

(56) References Cited

U.S. PATENT DOCUMENTS

| | | | |
|---|---|---|---|
| 7,396,281 B2 * | 7/2008 | Mendelsohn | G06Q 30/0209 725/23 |
| 8,082,297 B2 | 12/2011 | Syvain et al. | |
| 8,424,075 B1 * | 4/2013 | Walsh | H04L 63/0263 726/14 |
| 8,433,656 B1 * | 4/2013 | Evans | G06F 21/6236 705/902 |
| 8,631,417 B1 | 1/2014 | Mendes Da Costa et al. | |
| 9,165,426 B2 | 10/2015 | Jones et al. | |
| 9,218,468 B1 * | 12/2015 | Rappaport | H04L 63/12 |
| 9,342,211 B2 | 5/2016 | Deluca et al. | |
| 9,588,783 B1 * | 3/2017 | Syvain | G06F 9/453 |
| 10,063,916 B1 * | 8/2018 | Hardy | H04N 13/332 |
| 10,326,667 B2 | 6/2019 | Jones et al. | |
| 10,587,584 B2 | 3/2020 | Vikramaratne et al. | |
| 10,610,787 B2 | 4/2020 | Hamilton, II et al. | |
| 10,623,446 B1 * | 4/2020 | Stoler | H04L 63/101 |
| 10,664,903 B1 * | 5/2020 | Haitani | G02B 27/017 |
| 10,706,155 B1 * | 7/2020 | Veselov | G06F 9/45558 |

(Continued)

*Primary Examiner* — Aravind K Moorthy

(57) ABSTRACT

A system includes a memory and a processor coupled to the memory. The processor receives a first user credential associated with a first user and authorizes an avatar of the first user to enter a virtual environment. The processor receives a first selection of an experience theme and a second selection of at least one product type from the selected experience theme. The processor determines a first data file that provides a first benefit count to the first user when a first amount of data objects is transferred from a first data file of the first user to a second data file. The processor indicates to the first user that the first data file provides the first benefit count to the first user, receives a command to obtain the first data file, and initiates a registration process to register the first user to obtain the first data file.

20 Claims, 3 Drawing Sheets

(56) References Cited

U.S. PATENT DOCUMENTS

| | | | |
|---|---|---|---|
| 10,742,649 B1* | 8/2020 | Hook, Jr. | H04L 63/0272 |
| 10,831,805 B1* | 11/2020 | Buckingham | G06F 21/31 |
| 10,931,650 B1 | 2/2021 | Mccown et al. | |
| 10,981,069 B2 | 4/2021 | Kawachiya et al. | |
| 10,986,087 B2* | 4/2021 | Watson | G06F 3/017 |
| 11,043,219 B1* | 6/2021 | Walters | G10L 21/013 |
| 11,170,003 B2 | 11/2021 | Wu et al. | |
| 11,227,060 B1* | 1/2022 | John | G06F 21/606 |
| 11,282,066 B1* | 3/2022 | Spender | G06Q 20/3276 |
| 11,429,939 B1* | 8/2022 | Borunda | G06Q 20/10 |
| 11,546,322 B1* | 1/2023 | Hardjono | H04L 67/131 |
| 11,568,614 B1* | 1/2023 | Albero | G06F 3/011 |
| 11,769,198 B1* | 9/2023 | Doss | G06F 16/739 705/35 |
| 11,841,946 B1* | 12/2023 | Durvasula | G06F 21/53 |
| 11,930,005 B2* | 3/2024 | Young | H04L 63/1483 |
| 11,954,030 B1* | 4/2024 | Singh | G06F 3/067 |
| 11,995,620 B1* | 5/2024 | Borunda | H04L 63/083 |
| 12,028,348 B2* | 7/2024 | Varma | G06T 11/00 |
| 12,063,238 B2* | 8/2024 | Albero | G06F 18/214 |
| 12,093,355 B2* | 9/2024 | Bhatia | G06F 21/31 |
| 12,093,410 B1* | 9/2024 | Chavez | H04N 7/188 |
| 12,106,431 B2* | 10/2024 | Padiyar | G06V 10/141 |
| 12,112,301 B2* | 10/2024 | Padiyar | G06Q 20/4014 |
| 12,112,438 B2* | 10/2024 | Gupta | G06F 21/64 |
| 12,113,789 B2* | 10/2024 | Patel | G06T 11/00 |
| 12,126,606 B2* | 10/2024 | Ingram | H04L 63/08 |
| 12,149,624 B2* | 11/2024 | Akkapeddi | H04L 63/102 |
| 12,190,298 B1* | 1/2025 | Moore | G06Q 20/389 |
| 12,231,462 B2* | 2/2025 | Merdassa | H04L 63/1433 |
| 12,244,605 B2* | 3/2025 | Patel | H04L 63/107 |
| 12,251,638 B2* | 3/2025 | Horstman | A63F 13/79 |
| 12,259,954 B1* | 3/2025 | Dave | G06T 13/40 |
| 12,262,201 B1* | 3/2025 | Ganesan | H04W 12/068 |
| 12,273,327 B2* | 4/2025 | Race | H04L 67/131 |
| 12,273,333 B2* | 4/2025 | Agrawal | H04L 63/08 |
| 2007/0254631 A1 | 11/2007 | Spooner | |
| 2009/0234948 A1* | 9/2009 | Garbow | A63F 13/358 709/225 |
| 2010/0029371 A1* | 2/2010 | Medvinsky | H04L 67/51 463/25 |
| 2010/0037147 A1* | 2/2010 | Champion | G06F 21/316 715/751 |
| 2010/0057715 A1* | 3/2010 | Bates | G06F 21/31 707/E17.014 |
| 2010/0138755 A1* | 6/2010 | Kulkarni | G06F 9/455 715/757 |
| 2010/0250383 A1 | 9/2010 | Frazier et al. | |
| 2010/0299747 A1* | 11/2010 | Hamilton, II | H04L 9/3247 726/19 |
| 2011/0010675 A1* | 1/2011 | Hamilton, II | A63F 13/335 715/850 |
| 2011/0072367 A1 | 3/2011 | Bauer | |
| 2011/0165939 A1* | 7/2011 | Borst | A63F 13/63 463/29 |
| 2013/0014033 A1* | 1/2013 | Hamick | G06Q 50/01 715/757 |
| 2013/0156399 A1* | 6/2013 | Joy | H04N 21/8545 386/E9.011 |
| 2013/0339906 A1* | 12/2013 | Barthelt | G06Q 30/0643 715/850 |
| 2014/0026078 A1 | 1/2014 | Dawson et al. | |
| 2014/0096036 A1* | 4/2014 | Mohler | G06Q 10/10 715/753 |
| 2014/0176534 A1* | 6/2014 | Vignocchi | A63F 13/21 345/419 |
| 2014/0181706 A1* | 6/2014 | Vignocchi | A63F 13/79 715/764 |
| 2014/0282874 A1* | 9/2014 | Bennette | H04L 63/102 726/3 |
| 2015/0143487 A1* | 5/2015 | Nathan | H04L 63/08 726/6 |
| 2016/0055758 A1* | 2/2016 | Francis | G09B 7/00 434/236 |
| 2016/0269508 A1* | 9/2016 | Sharma | H04L 63/0884 |
| 2016/0350609 A1* | 12/2016 | Mason | G06T 15/20 |
| 2017/0087473 A1* | 3/2017 | Siegel | G07F 17/3293 |
| 2017/0103571 A1* | 4/2017 | Beaurepaire | G06F 3/011 |
| 2017/0236328 A1* | 8/2017 | Eatedali | G01C 21/3688 345/633 |
| 2017/0237747 A1* | 8/2017 | Quinn | G06F 21/602 726/29 |
| 2017/0262855 A1* | 9/2017 | Venugopalan | G06Q 20/40145 |
| 2017/0345195 A1* | 11/2017 | Eatedali | G06Q 20/123 |
| 2017/0364920 A1* | 12/2017 | Anand | H04L 63/0861 |
| 2018/0059775 A1* | 3/2018 | Shafer | G06T 11/60 |
| 2018/0063088 A1* | 3/2018 | Hardy | H04L 63/0272 |
| 2018/0089898 A1* | 3/2018 | Huddy | H04W 4/029 |
| 2018/0104595 A1 | 4/2018 | Kawachiya et al. | |
| 2018/0109510 A1* | 4/2018 | Tommy | H04L 63/083 |
| 2018/0123816 A1 | 5/2018 | Tandon et al. | |
| 2018/0150690 A1* | 5/2018 | Yin | A61B 3/0008 |
| 2018/0285538 A1* | 10/2018 | Zhu | G06F 21/31 |
| 2018/0285549 A1* | 10/2018 | Sonkar | G06Q 20/40145 |
| 2018/0321744 A1* | 11/2018 | Cheaz | G06F 3/011 |
| 2019/0089701 A1* | 3/2019 | Mercury | G06Q 10/105 |
| 2019/0138914 A1* | 5/2019 | Meadows | H04L 51/52 |
| 2019/0171807 A1* | 6/2019 | Gadge | G06F 3/017 |
| 2019/0354669 A1* | 11/2019 | Brantley | G06F 21/36 |
| 2019/0369837 A1* | 12/2019 | Davis | H04N 7/157 |
| 2019/0377417 A1* | 12/2019 | Friedman | G06F 3/017 |
| 2020/0089855 A1* | 3/2020 | Chou | H04L 9/32 |
| 2020/0160345 A1* | 5/2020 | Damania | G06V 40/70 |
| 2020/0228524 A1* | 7/2020 | Szafranski | A63F 13/79 |
| 2020/0233485 A1* | 7/2020 | Chan | A61M 21/02 |
| 2020/0293120 A1* | 9/2020 | Timonen | G06F 3/011 |
| 2020/0338458 A1 | 10/2020 | Huang et al. | |
| 2020/0412538 A1* | 12/2020 | Rosado | H04L 63/126 |
| 2021/0004452 A1* | 1/2021 | Swaminathan | G06F 21/43 |
| 2021/0042748 A1 | 2/2021 | Sepulveda et al. | |
| 2021/0089637 A1* | 3/2021 | Cummins | H04L 63/0861 |
| 2021/0134110 A1* | 5/2021 | Irwin, Jr. | G06F 21/31 |
| 2021/0141880 A1* | 5/2021 | Pauli | G06F 3/013 |
| 2021/0209214 A1* | 7/2021 | Martin | G06F 3/013 |
| 2021/0256597 A1* | 8/2021 | Soppin | H04L 63/0853 |
| 2021/0318894 A1* | 10/2021 | Swaminathan | G06F 9/44526 |
| 2021/0328985 A1* | 10/2021 | Albero | G06F 21/34 |
| 2021/0358222 A1* | 11/2021 | Pejsa | G06F 3/0346 |
| 2022/0038891 A1* | 2/2022 | duPont | G06V 10/25 |
| 2022/0066621 A1* | 3/2022 | Appelbaum | H04L 65/1093 |
| 2022/0070167 A1* | 3/2022 | Adams, Jr. | G06F 21/30 |
| 2022/0116231 A1* | 4/2022 | Choi | G06Q 20/40145 |
| 2022/0167021 A1* | 5/2022 | French | H04N 21/2187 |
| 2022/0188833 A1* | 6/2022 | May | G06Q 20/40145 |
| 2022/0197989 A1* | 6/2022 | Rakshit | G06F 3/017 |
| 2022/0327225 A1* | 10/2022 | Lyren | H04S 1/007 |
| 2022/0374505 A1* | 11/2022 | Katz | G06F 3/013 |
| 2023/0026368 A1* | 1/2023 | Silverstein | G06F 16/986 |
| 2023/0085183 A1* | 3/2023 | Kuneva | G06Q 30/0601 705/72 |
| 2023/0128474 A1* | 4/2023 | Rodriguez Bravo | H04L 63/1416 726/22 |
| 2023/0136394 A1* | 5/2023 | Saito | G06F 21/31 726/6 |
| 2023/0139813 A1* | 5/2023 | Thiel | G06F 21/31 726/7 |
| 2023/0153884 A1* | 5/2023 | Parekh | G06Q 50/01 705/26.7 |
| 2023/0161887 A1* | 5/2023 | Albero | G06F 21/604 |
| 2023/0206781 A1* | 6/2023 | Robinson | A63F 13/803 434/43 |
| 2023/0254300 A1* | 8/2023 | Silverstein | G06F 21/30 726/10 |
| 2023/0291563 A1* | 9/2023 | Pan | H04L 9/001 |
| 2023/0291740 A1* | 9/2023 | Ashby | H04L 63/083 |
| 2023/0305621 A1* | 9/2023 | Hadi | G06F 3/012 |
| 2023/0316263 A1* | 10/2023 | Eby | H04L 9/3271 |
| 2023/0319030 A1* | 10/2023 | Young | G06F 3/0482 726/6 |

(56) References Cited

U.S. PATENT DOCUMENTS

| | | | |
|---|---|---|---|
| 2023/0342760 A1* | 10/2023 | Patel | H04L 9/3234 |
| 2023/0370290 A1* | 11/2023 | Agarwal | H04L 9/3228 |
| 2023/0372830 A1* | 11/2023 | Gillis | H04L 9/3228 |
| 2023/0388299 A1* | 11/2023 | Gupta | H04L 63/0861 |
| 2023/0403270 A1* | 12/2023 | Kim | H04L 63/0861 |
| 2024/0004975 A1* | 1/2024 | Bivens | G06F 21/316 |
| 2024/0007464 A1* | 1/2024 | Mavani | H04L 63/0853 |
| 2024/0009574 A1* | 1/2024 | Horstman | A63F 13/71 |
| 2024/0012888 A1* | 1/2024 | Varma | H04L 67/306 |
| 2024/0013166 A1* | 1/2024 | Padiyar | G06Q 20/4014 |
| 2024/0022553 A1* | 1/2024 | Ingram | H04L 63/08 |
| 2024/0022561 A1* | 1/2024 | Ingram | H04L 63/08 |
| 2024/0022599 A1* | 1/2024 | Merdassa | H04L 63/1433 |
| 2024/0028675 A1* | 1/2024 | Merdassa | G06F 21/31 |
| 2024/0031162 A1* | 1/2024 | Singh | H04L 9/50 |
| 2024/0031182 A1* | 1/2024 | Krol | H04L 12/1831 |
| 2024/0031346 A1* | 1/2024 | Merdassa | H04L 63/08 |
| 2024/0036900 A1* | 2/2024 | Rudraraju | H04L 63/1483 |
| 2024/0037196 A1* | 2/2024 | Polasa | G06F 11/3438 |
| 2024/0037514 A1* | 2/2024 | Padiyar | G06Q 20/384 |
| 2024/0037861 A1* | 2/2024 | Gupta | H04L 9/3213 |
| 2024/0039926 A1* | 2/2024 | Gupta | H04L 67/131 |
| 2024/0039935 A1* | 2/2024 | Rudraraju | H04L 63/1425 |
| 2024/0070344 A1* | 2/2024 | Samuel | G06F 30/20 |
| 2024/0070653 A1* | 2/2024 | Cho | H04L 9/50 |
| 2024/0073205 A1* | 2/2024 | Gupta | H04L 63/10 |
| 2024/0078297 A1* | 3/2024 | Bhatia | G06F 3/011 |
| 2024/0080194 A1* | 3/2024 | Akkapeddi | H04L 63/107 |
| 2024/0086030 A1* | 3/2024 | Patel | G06F 3/04815 |
| 2024/0089327 A1* | 3/2024 | Patel | H04L 65/403 |
| 2024/0106803 A1* | 3/2024 | Race | H04L 9/008 |
| 2024/0111847 A1* | 4/2024 | Akkapeddi | G06F 21/31 |
| 2024/0112409 A1* | 4/2024 | Cross | G06T 19/003 |
| 2024/0118691 A1* | 4/2024 | Valeri | G05D 1/0016 |
| 2024/0118784 A1* | 4/2024 | Wang | G06F 3/0484 |
| 2024/0129302 A1* | 4/2024 | Singh | H04L 63/0853 |
| 2024/0135482 A1* | 4/2024 | Wang | G06F 3/011 |
| 2024/0135649 A1* | 4/2024 | Singh | A63F 13/87 |
| 2024/0137223 A1* | 4/2024 | Wang | H04L 9/3236 |
| 2024/0143709 A1* | 5/2024 | Pandey | G06F 21/31 |
| 2024/0143721 A1* | 5/2024 | Naik | G06T 19/006 |
| 2024/0152917 A1* | 5/2024 | Singh | H04L 9/50 |
| 2024/0157240 A1* | 5/2024 | Chayanam | A63F 13/55 |
| 2024/0160272 A1* | 5/2024 | Soryal | G06F 3/011 |
| 2024/0160704 A1* | 5/2024 | Albero | G06F 21/16 |
| 2024/0163284 A1* | 5/2024 | Albero | H04L 63/0861 |
| 2024/0169037 A1* | 5/2024 | Dravneek | G06F 21/31 |
| 2024/0171413 A1* | 5/2024 | Dravneek | H04L 9/3273 |
| 2024/0177413 A1* | 5/2024 | Padiyar | G06V 10/141 |
| 2024/0185514 A1* | 6/2024 | Singh | G06F 3/013 |
| 2024/0187235 A1* | 6/2024 | Brid | H04L 9/30 |
| 2024/0195825 A1* | 6/2024 | Durvasula | H04L 63/1425 |
| 2024/0221323 A1* | 7/2024 | Mukherjee | G06V 10/761 |
| 2024/0257101 A1* | 8/2024 | Rai | G06Q 30/0601 |
| 2024/0257466 A1* | 8/2024 | Harsha | G06T 17/205 |
| 2024/0259201 A1* | 8/2024 | Enciso | H04L 63/0428 |
| 2024/0273005 A1* | 8/2024 | Bussa | G06F 11/3692 |
| 2024/0273006 A1* | 8/2024 | Bussa | G06F 11/3692 |
| 2024/0273012 A1* | 8/2024 | Bussa | G06F 11/3698 |
| 2024/0275770 A1* | 8/2024 | Agrawal | H04L 63/08 |
| 2024/0283649 A1* | 8/2024 | Richter | H04L 9/3297 |
| 2024/0305647 A1* | 9/2024 | Rodriguez Bravo | H04L 63/1416 |
| 2024/0378280 A1* | 11/2024 | Brown | G06F 21/44 |
| 2025/0061635 A1* | 2/2025 | Dave | G09B 21/00 |

* cited by examiner

SYSTEM AND METHOD FOR GENERATING A VIRTUAL EXPERIENCE IN A VIRTUAL ENVIRONMENT

TECHNICAL FELD

The present disclosure relates generally to network communication, and more specifically to a system and method for generating a virtual experience in a virtual environment.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by allowing a user to securely access a virtual environment and perform secure data interactions in the virtual environment. The disclosed system and methods provide several practical applications and technical advantages.

For example, the disclosed system and methods provide the practical application of improving interoperability of real-world systems and virtual world systems (e.g., metaverse systems) so that information may be seamlessly shared between these systems to implement data security, authorization of data interactions, and other data interactions performed in real-world and virtual environments. For example, user information collected from the user and/or assigned to the user in a real-world environment may be used in a virtual environment (e.g., metaverse environment) to authenticate the user before allowing the user to access the virtual environment and perform any kind of action or interaction within the virtual environment. Additionally or alternatively, as described in embodiments of the present disclosure, user information collected from the user and/or assigned to the user in the real-world environment may be used in the virtual environment (e.g., metaverse environment) to provide access to products within the virtual environment. This process provides improved information security because it authenticates that an avatar is associated with the user and not an unauthorized party and that the user is authorized to access the virtual environment, and products provided in the virtual environment.

Thus, the disclosed system and methods improve data security in the virtual environment. By improving data security in virtual environment, the disclosed system and methods generally improve technology related to performing secure data interactions in a virtual environment.

The disclosed system and methods provide the additional practical application of saving memory resources. The seamless data flow between the real-world systems and virtual-world systems as a result of interoperability of these systems allows each system to store less data by avoiding the need to store the same data (e.g., authentication data, login credentials, etc.) in both systems, as data stored in one system can be accessed, or otherwise leveraged, by the other system. This saves memory resources by avoiding duplication of data. The saving of memory resources may leave more system memory for storing other data used in other technical operations. This provides the additional technical advantage of improving processing efficiency of computing systems that manage the real-world and virtual word environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
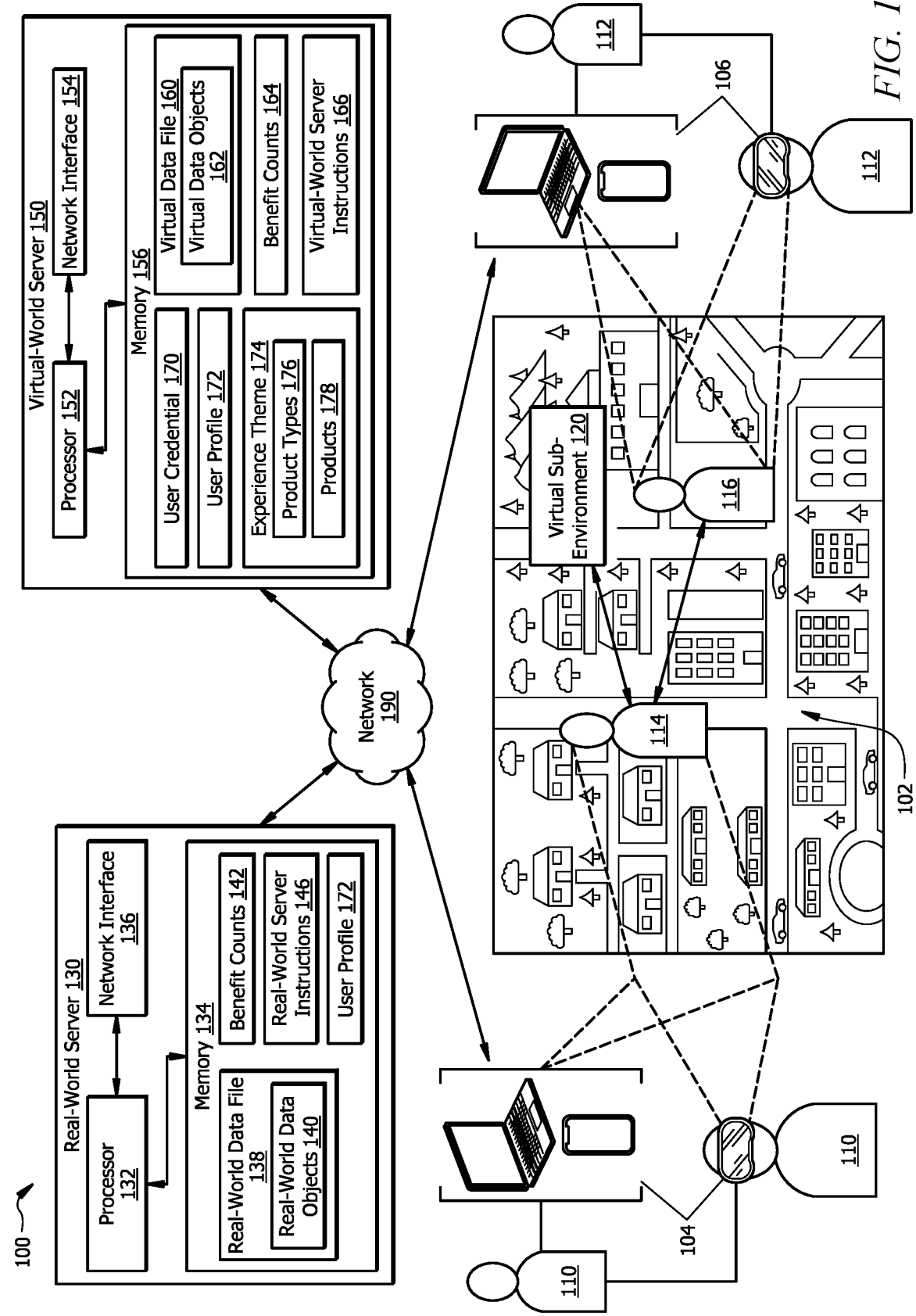
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, real-world server 130, and a virtual-world server 150, each connected to a network 180. A first user 110 is associated with the first user device 104 and a second user 112 is associated with the second user device 106. The system 100 may be communicatively coupled to the communication network 190 and may be operable to transmit data between each one of the first user device 104, second user device 106, real-world server 130, and virtual-world server 150 through the communication network 190.

In general, the system 100 may improve interoperability of real-world systems and virtual world systems (e.g., metaverse systems) so that information may be seamlessly shared between these systems to implement data security, authorization of data interactions, access to virtual sub-environments and other data interactions performed in real-world and virtual environments. For example, user information collected from the user and/or assigned to the user in a real-world environment may be used in a virtual environment 102 (e.g., metaverse environment) to authenticate the first user 110 before allowing the first user 110 to access the virtual environment 102 and perform any kind of action or interaction within the virtual environment 102. Additionally or alternatively, user information collected from the first user 110 and/or assigned to the first user 110 in the real-world environment or virtual environment 102 may be used in the virtual environment 102 (e.g., metaverse environment) to provide the first user 110 access to products and/or services within the virtual environment 102. This process provides improved information security because it authenticates that a first avatar 114 is associated with the first user 110, not an unauthorized party, and that the first user 110 is authorized to access the virtual environment 102, obtain products and services within the virtual environment 102 and perform data interactions. Further, a user may obtain a product by transferring real-world data objects between real-world entities based on data interactions performed in the virtual environment 102.

It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment 102 (e.g., a metaverse environment). Further, it may be noted that while certain embodiments of the present disclosure may be described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any other user (e.g., second user 112) connected to network 190.

The first user 110 may access the virtual environment 102 (e.g., a metaverse environment) through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable, and user defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users, objects and/or entities through a respective avatar. For example, the second user 112 may attempt to engage in an interaction session with the first avatar 114 through a second avatar 116 associated with the second user 112. In another example, the first avatar 114 of the first user 110 may access a virtual sub-environment 120 within the virtual environment 102 and perform virtual data interactions within the virtual sub-environment 120. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and the second avatar 116 occurs or the first avatar 114 can access the virtual sub-environment 120, the virtual-world server 150 may authenticate that the first avatar 114 is associated with the first user 110 and not an unauthorized third-party. For example, the first user 110 may be required to sign into a secure portal that provides access to a data file (e.g., real-world data file 138 and/or virtual data file 160) associated with the first user 110. As shown in FIG. 1, a real-world data file 138 of the first user 110 is stored and managed by the real-world server 130 and a virtual data file 160 of the first user 110 is stored and managed by the virtual-world server 150. In one or more embodiments, the virtual-world server 150 may employ single sign-on (SSO), multifactor authentication, or any other suitable authentication scheme in order to allow the first user 110 access to the virtual data file 160. Similarly, the real-world server 130 may employ single sign-on (SSO), multifactor authentication, or any other suitable authentication scheme in order to allow the first user 110 access to the real-world data file 138. The virtual data file 160 and the real-world data file 138 may include virtual data objects 162 and real-world data objects 140 respectively owned by the first user 110. The real-world server 130 and the virtual-world server 150 may store other information related to the first user 110 including, but not limited to, user profile information, account information (e.g., including identity and other details relating to the respective data files 138 and 160), avatar information, digital assets (e.g., respective real-world data objects 140 and virtual data objects 162) information, or any other suitable type of information that is associated with a user within the virtual environment 102 and/or the real-world environment.

As shown in FIG. 1, virtual-world server 150 comprises a processor 152, a memory 156, and a network interface 154. The processor 152 comprises one or more processors operably coupled to the memory 156. The processor 152 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 166) to implement the virtual-world server 150. In this way, processor 152 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIGS. 1 and 3. For example, the processor 152 may be configured to perform at least a portion of the method 300 as described in FIG. 3.

The memory 156 comprises one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store user credential 170, user profile 172, experience themes 174, product types 176, products 178, virtual data file 160, virtual data objects 162, benefit counts 164 and the virtual-world server instructions 166. The virtual-world server instructions 166 may include any suitable set of instructions, logic, rules, or code operable to execute the virtual-world server 150.

The network interface 154 is configured to enable wired and/or wireless communications. The network interface 154 is configured to communicate data between the virtual-world server 150 and other devices, systems, or domains (e.g. user devices 104 and 106 and real-world server 130). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

The real-world server 130 comprises a processor 132, a memory 134, and a network interface 136. The processor 132 comprises one or more processors operably coupled to the memory 134. The processor 132 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 132 may be a programmable logic device, a microcontroller, a microprocessor, or any suitable combination of the preceding. The processor 132 is communicatively coupled to and in signal communication with the memory 134. The one or more processors are configured to process data and may be implemented in hardware or software. For example, the processor 132 may be 8-bit, 16-bit, 32-bit, 64-bit or of any other suitable architecture. The processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 146) to implement the real-world server 130. In this way, processor 132 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIGS. 1 and 3. For example, the processor 132 may be configured to perform at least a portion of the method 300 as described in FIG. 3.

The memory 134 comprises one or more disks, tape drives, or solid-state drives, and may be used as an over-flow data storage device, to store programs when such programs are selected for execution, and to store instructions and data that are read during program execution. The memory 134 may be volatile or non-volatile and may comprise a read-only memory (ROM), random-access memory (RAM), ternary content-addressable memory (TCAM), dynamic random-access memory (DRAM), and static random-access memory (SRAM).

The memory 134 is operable to store information relating to real-world data file 138, real-world data objects 140, benefit counts 142 and the real-world server instructions 146. The real-world server instructions 146 may include any suitable set of instructions, logic, rules, or code operable to execute the real-world server 130.

The network interface 136 is configured to enable wired and/or wireless communications. The network interface 136 is configured to communicate data between the real-world server 130 and other devices, systems, or domains (e.g. user devices 104 and 106, and virtual-world server 150). For example, the network interface 136 may comprise a Wi-Fi interface, a LAN interface, a WAN interface, a modem, a switch, or a router. The processor 132 is configured to send and receive data using the network interface 136. The network interface 136 may be configured to use any suitable type of communication protocol as would be appreciated by one of ordinary skill in the art.

Each of the real-world server 130 and the virtual-world server 150 is generally a suitable server (e.g., including a physical server and/or virtual server) operable to store data in a memory (e.g., respective memories 134 and 156) and/or provide access to application(s) or other services. One or both of the real-world server 130 and the virtual-world server 150 may be a backend server associated with a particular entity (e.g., organization) that facilitates conducting data interactions between entities, between one or more users, and/or between a user and an entity. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in the virtual environment 102 (e.g., a metaverse environment). It may be noted that the operations performed by the real-world server 130 and the virtual-world server 150 described in embodiments of the present disclosure may be implemented by a single server.

The communication network 190 may facilitate communication within the system 100. This disclosure contemplates the communication network 190 being any suitable network operable to facilitate communication between the first user device 104, second user device 106, real-world server 130, and virtual-world server 150. Communication network 190 may include any interconnecting system capable of transmitting audio, video, signals, data, messages, or any combination of the preceding. Communication network 190 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., real-world server 130, virtual-world server 150), databases, etc. through the communication network 190. Each of the user devices may be configured to perform specific functions described herein and interact with one or both of real-world server 130 and the virtual-world server 150, e.g., via respective user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.

Example User Device

Figure 2:
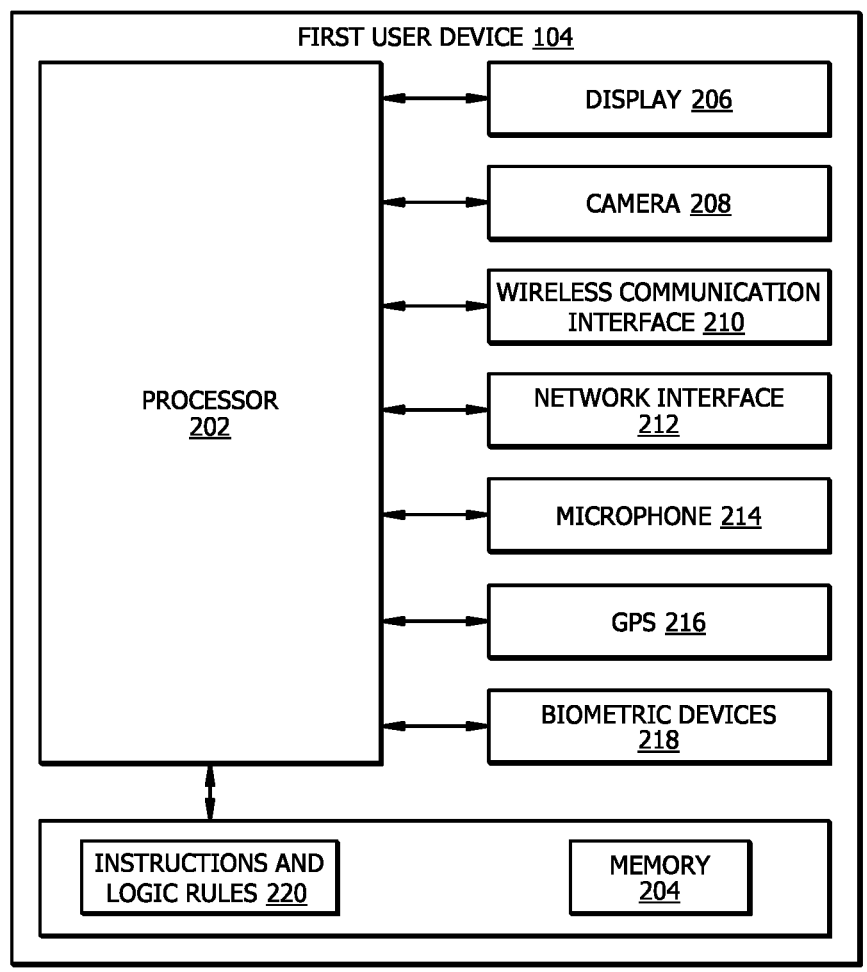
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1) or between the first user 110 and an entity (e.g., represented by a virtual entity in the virtual environment 102).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150 and/or second user device 106. In some embodiments, the function described herein is implemented using logic units, FPGAs, ASICs, DSPs, or any other suitable hardware or electronic circuitry.

Figure 3:
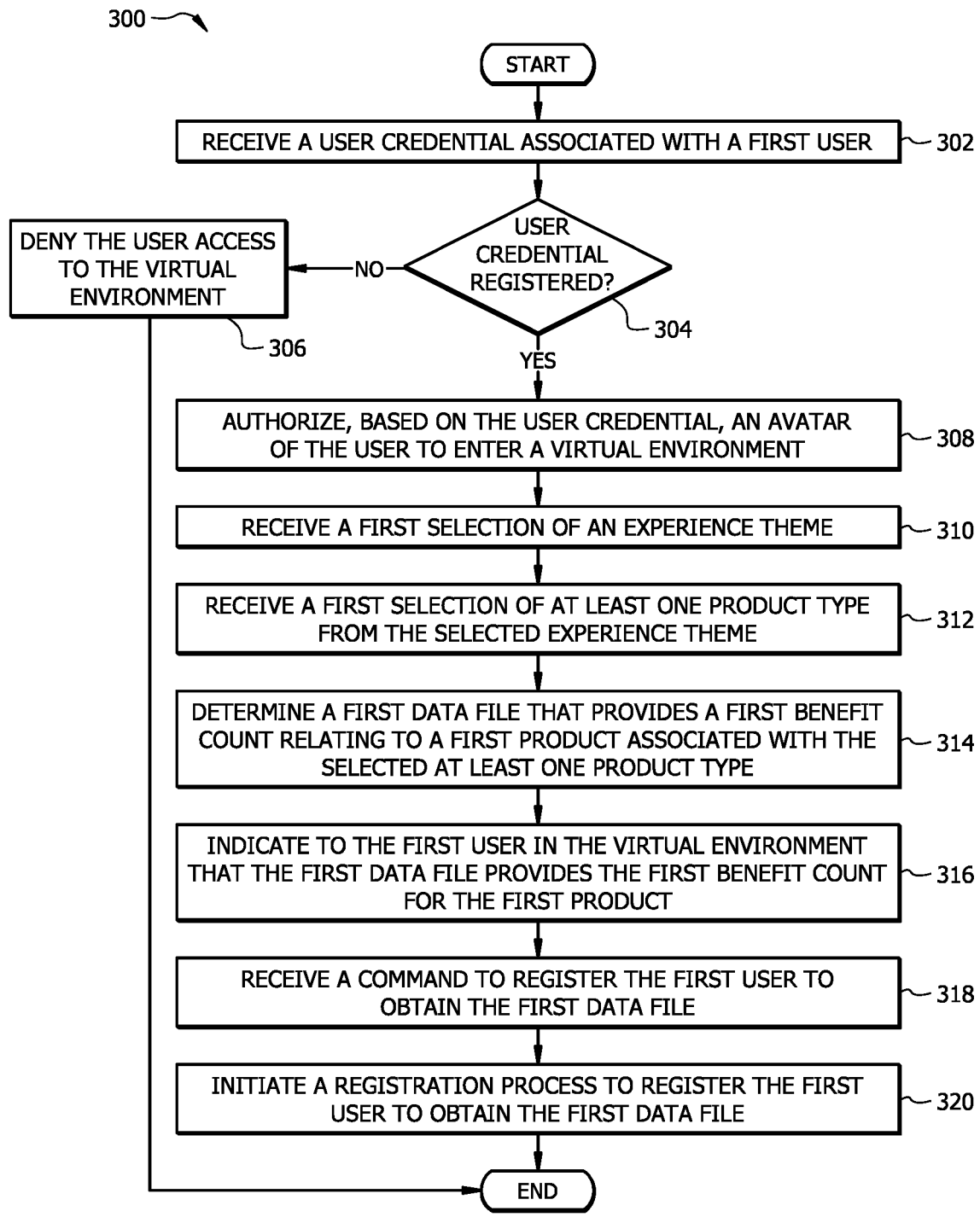
FIG. 3 illustrates a flowchart of an example method for performing data interactions in a virtual environment, in accordance with one or more embodiments of the present disclosure.

The memory 204 is operable to store any of the information described with respect to FIGS. 1 and 3 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user profile 172), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, and one or more user devices (e.g., second user device 106) may be part of an Information Technology (IT) infrastructure of an entity or organization. For example, second user 112 may be a representative of the entity or organization who may use the second user device 106 to enter the virtual environment 102 and virtually interact with one or more users (e.g., first user 110) via the second avatar 116 to provide services to the first user 110.

The real-world server 130 may be configured to allow users (e.g., first user 110) registered with the real-world server 130 to perform one or more data interactions in the real-world environment. Similarly, virtual-world server 150 may be configured to allow users (e.g., first user 110) registered with the virtual-world server 150 to perform one or more data interactions in the virtual environment 102 (e.g., a metaverse environment). When the real-world server 130 and/or the virtual-world server 150 are owned and/or operated by a particular entity or organization (e.g., are part of the IT infrastructure of the entity or organization), being registered with the real-world server 130 and/or the virtual-world server 150 may also be interpreted as being registered with the particular entity or organization. For example, when the first user 110 is registered with the virtual-world server 150, this may be interpreted as the first user 110 being registered with the entity or organization that owns and/or manages the virtual world server 150. In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the virtual environment 102 (e.g., a metaverse environment). In alternative embodiments, the real-world server 130 and the virtual-world server 150 may be owned and/or operated by different entities/organizations. For example, the real-world server 130 may be owned and/or operated by a first entity and the virtual-world server 150 may be owned and/or operated by a second entity different from the first entity.

In one or more embodiments, as the first user 110 initially registers with the real-world server 130 in the real-world environment, the real-world server 130 may collect several pieces of information from the user including information relating to the identity of the user such as legal name, social security number, biometrics (e.g., fingerprints, retina scans, face ID etc.), residence address, phone numbers, assets owned by the user, and copies of government issued documents (e.g., drivers permit, state identity card etc.). This information is stored by real-world server 130 as part of user profile 172 of the first user 110. In one embodiment, at least a portion of the user profile 172 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 138 for the first user 110 in which the first user 110 may store real-world data objects 140 owned by the first user 110. In one example, the first user 110 may engage in a real-world interaction with a service representative managing the real-world server 130 (e.g., physical interaction at an office location, over phone, voice chat etc.) to provide such information that can be used to register the first user 110 at the real-world server 130 and generate the real-world data file 138 of the first user 110. In another example, the first user 110 may engage in a real-world interaction by accessing a webpage provided and managed by the real-world server 130. Once the first user 110 initiates a registration process via the webpage, the real-world server 130 may walk the first user 110 through several steps in which the first user 110 may be requested to provide information necessary to verify the identity of the first user 110 and register the first user 110 with the real-world server 130.

Information relating to the real-world data file 138 of the first user 110 may be stored as part of the user profile 172 of the first user 110. This information may include, but is not limited to, an identity (e.g., unique name or number) of the real-world data file 138, amount of real-world data objects 140 stored in the real-world data file 138, a log of data interactions conducted in relation to the real-world data file 138 and any other information relating to the real-world data file 138. As described below, the information relating to the real-world data file 138 of the first user 110 may further include a benefit count 142 associated with the real-world data file 138.

Once registered with the real-world server 130, the real-world server 130 may allow the first user 110 to perform one or more data interactions in the real-world environment. For example, a real-world data interaction may include transferring one or more real-world data objects 140 from the real-world data file 138 of the first user 110 to a second real-world data file (not shown) of the second user 112 or another entity. Another example data interaction may include receiving one or more real-world data objects 140 in the real-world data file 138 of the first user 110 from the second real-world data file of the second user 112 or another entity. Another example data interaction may include requesting by the first user 110 transfer of real-world data objects from a data file of a second user to a user data file of a third user as part of satisfying an agreement between the first user 110 and the third user. Another example data interaction may include modifying at least a portion of the user profile 172 (e.g., user credentials to access the real-world server, phone numbers, residential address, email address, information relating to user assets etc.) stored at the real-world server 130. It may be noted that a data interaction in accordance with embodiments of the present disclosure refers to any interaction in the real-world environment and/or virtual environment 102 that includes transfer of data between computing nodes (e.g., first user device 104, second user device 106, real-world server 130 and virtual-world server 150).

The first user 110 may additionally register with the virtual-world server 150. In one embodiment, when initially registering with the virtual-world server 150, the first user 110 may provide to the virtual-world server 150 a credential (e.g., username and password) that provides the first user 110 access to the real-world server 130. In one embodiment, a single web page or web portal may allow the first user 110 to register with the real-world server 130 as well as the virtual-world server 150. The first user 110 may first register with the real-world server 130 as described above and generate credentials that allow the first user 110 access to the real-world server 130 and services provided by the real-world server 130. Once registered with the real-world server 130, the web portal may provide the first user 110 an option to additionally register with the virtual-world server 150 which may allow the first user 110 to perform data interactions in the virtual environment 102. Registration with the virtual-world server 150 may include generating a user credential 170 that allows the first user 110 to log in to the virtual-world server 150 and enter the virtual environment 102 via first avatar 114 of the first user 110. Once registered with the virtual-world server 150, the first user 110 may generate a virtual data file 160 in which the first user 110 may store virtual data objects 162 owned by the first user 110. In one or more embodiments, the virtual data file 160 of the first user 110 is associated with the real-world data file 138 of the first user 110. For example, the virtual data file 160 is a virtual image of the real-world data file 138, wherein the virtual data objects 162 correspond to the real-world data objects 140. In other words, the virtual data file 160 is a virtual representation of the real-world data file 138. In another example, the virtual data file 160 stores a portion of the real-world data objects 140 in the form of virtual data objects 162. In another example, real-world data objects 140 may be converted to virtual data objects 162, and vice versa. In this case, there may not be a one-to-one conversion between the real-world data objects 140 and virtual data objects 162. For example, one real-world data object 140 may be converted to a plurality of virtual data objects 162, wherein the conversion ratio may dynamically change from time to time. In one embodiment, when the real-world server 130 and the virtual-world server 150 are owned and/or managed by the same entity or organization, the first user 110 may use the same user credential 170 to login to the real-world server 130 as well as the virtual-world server 150.

Information relating to the virtual data file 160 of the first user 110 may be stored by the virtual-world server 150 as part of the user profile 172 of the first user stored at the virtual-world server 150. This information may include, but is not limited to, an identity of the virtual data file 160, amount of virtual data objects 162 stored in the virtual data file 160, a log of virtual data interactions conducted in the virtual environment 102 in relation to the virtual data file 160 and any other information relating to the virtual data file 160. As described below, the information relating to the virtual data file 160 of the first user 110 may further include a benefit count 164 associated with the virtual data file 160.

In certain embodiments, when the real-world server 130 and the virtual-world server 150 are owned and/or managed by different entities, first user 110 may separately register with one of the real-world server 130 and the virtual-world server 150 without registering with the other. For example, when the real-world server 130 is registered with a first entity and the virtual-world server 150 is registered with a second entity different from the first entity, first user 110 may separately register with the virtual-world server 150 without registering or needing to register with the real-world server 130. For example, as the first user 110 separately registers with the virtual-world server 150, the virtual-world server 150 may collect several pieces of information from the first user 110 including information relating to the identity of the user such as legal name, social security number, biometrics (e.g., fingerprints, retina scans, face ID etc.), residence address, phone numbers, assets owned by the user, and copies of government issued documents (e.g., drivers permit, state identity card etc.). This information is stored by virtual-world server 150 as part of user profile 172 of the first user 110. In one embodiment, at least a portion of the user profile 172 relating to the first user 110 collected in by the virtual-world server 150 may be stored in the real-world server 130. Once the identity of the first user 110 is confirmed and all other information provided by the first user 110 is verified to be correct, the virtual-world server 150 may generate the virtual data file 160 for the first user 110 in which the first user 110 may store virtual data objects 162 owned by the first user 110.

Once registered with the virtual-world server 150, the virtual-world server 150 may allow the first user 110 to perform one or more virtual data interactions. For example, a virtual data interaction may include transferring one or more virtual data objects 162 from the virtual data file 160 of the first user 110 to a second virtual data file (not shown) of the second user 112 or another entity. Another example data interaction may include receiving one or more virtual data objects 162 in the virtual data file 160 of the first user 110 from the second virtual data file of the second user 112 or another entity. Another example data interaction may include requesting by the first user 110 transfer of virtual data objects 162 from a data file of a second user to a data file of a third user as part of satisfying an agreement between the first user 110 and the third user. Another example data interaction may include modifying at least a portion of the user profile 172 (e.g., user credentials to access the real-world server, phone numbers, residential address, email address, information relating to user assets etc.) stored at the virtual-world server 150.

In one or more embodiments, the virtual data file (e.g. virtual data file 160) is a software application running on a computing node owned and/or operated by the respective user (e.g., first user 110). For example, when the first user 110 desires to receive virtual data objects 162 from a virtual data file of the second user 112, first user 110 may direct the second user 112 to a unique cryptographic address (e.g., public key) issued by the virtual data file 160. In one embodiment, the virtual data file 160 may not itself store the virtual data objects 162 but may store information that points to a location of the virtual data objects 162, for example, on a server (e.g., virtual-world server 150). Virtual data file 160 may be web-based or hardware-based. For example, virtual data file 160 may be stored in a mobile device or a desktop computer connected to the internet. Additionally or alternatively, virtual data file 160 may be stored in a device (e.g., USB drive) that is not connected to the network 190.

In certain embodiments, virtual environment 102 may include one or more virtual sub-environments 120. A virtual sub-environment 120 may be a designated region within the virtual environment 102 for use by a user (e.g., first user 110) or an entity/organization. For example, a virtual sub environment 120 may be assigned to a particular entity which may provide one or more services to users of the virtual environment 102. The virtual sub-environment 120 may take any form in the virtual environment 102 including, but not limited to, a virtual room, a virtual building or portions thereof, a virtual store, or any other designated virtual space/region within the virtual environment 102. Virtual-world server 150 may be configured to generate virtual sub-environments 120 with the virtual environment 102. A virtual sub-environment 120 is usually generated for a customized purpose. For example, a virtual sub-environment 120 may be used by an entity that is assigned the virtual sub-environment 120 for receiving virtual data objects 162 from users for storing in virtual data files 160 and/or for distribution to specified one or more target entities. Further a virtual sub-environment may allow users (e.g., first user 110) of the virtual environment 102 to perform virtual data interactions including transferring virtual data objects 162 to other users (e.g., second user 112) and/or one or more target entities. As described below, virtual-world server 150 may be configured to generate customized virtual sub-environments 120 that may be used to provide customized virtual experiences to users.

Data security is important in any system that supports online data interactions between computing nodes of the system. Online data interactions in real-world environments have existed for several decades and robust measures are already in place to ensure data security in real-world systems. However, virtual-world technology (e.g., metaverse technology) is relatively new and data security is a challenge in metaverse systems as the development of metaverse related technologies is still at a nascent stage and standardized systems that provide robust data security are not yet in place.

Embodiments of the present disclosure leverage user data collected and/or assigned in a real-world environment for providing data security in a metaverse environment. In general, embodiments of the present disclosure describe techniques that improve interoperability of real-world systems and virtual world systems (e.g., metaverse systems) so that information may be seamlessly shared between these systems to implement data security and other data interactions performed in real-world and virtual environments. In one or more embodiments, the system and methods discussed herein use information stored in a user profile 172 of the first user 110 generated during real-world data interactions with the first user 110 to allow the first user 110 to securely obtain products and/or services in the virtual environment 102.

In one or more embodiments, virtual-world server 150 may be configured to use a user credential 170 collected from the first user 110, generated by the first user 110 or assigned to the first user 110 during real-world data interactions with the first user 110, to verify identity of the first user 110 in the virtual environment 102. Thus, the user credential 170 provides the first user 110 access to the virtual environment 102. For example, the user credential 170 may be used by the virtual-world server 150 to verify that the first avatar 114 belongs to and is controlled by the first user 110.

In one example, user credential 170 may include a username and password generated by the first user 110 as part of registering with the real-world server 130. The virtual-world server 150 may allow the first user 110 to use the same username and password to enter the virtual environment 102 via first avatar 114. In an alternative embodiment, the first user 110 may generate a separate user credential (different from the user credential 170) as part of registering with the real-world server 130 and use the separate user credential to log into the real-world server 130 and perform real-world data interaction. The first user 110 may separately generate user credential 170 as part of registering with the virtual-world server 150 (e.g., during a real-world data interaction with the real-world server 130). Once the first user 110 has registered with the virtual-world server 150 and generated the user credential 170, the first user 110 may use the user credential 170 to log into the virtual-world server 150 and perform virtual-world data interactions. The user credential 170 of the first user 110 may be associated with the user profile 172 of the first user 110.

In one embodiment, a second user 112 may gain access to the virtual-world server 150 and enter the virtual environment 102 without registering with the virtual-world server 150 and/or real-world server 130. In other words, virtual-world server 150 may allow the second user 112 to enter the virtual environment 102 as a guest user. For example, in order to enter the virtual environment 102 as a guest user, second user 112 may need to complete a simple verification process that may include verifying the identity of the second user 112 (e.g., using email verification, text verification etc.) and setting up a temporary avatar (e.g., second avatar 116) to navigate the virtual environment 102. In one embodiment, if the identity of the second user 112 is successfully verified, virtual world server 150 may generate a temporary user credential 170 which the second user 112 may use to access the virtual environment 102 as a guest user. It may be noted that, a guest user who is not registered with the real-word server 130 or virtual-world server 150 may not have access to the full array of products and/or services provided by the respective real-word server 130 or virtual-world server 150.

Virtual-world server 150 may be configured to facilitate a user (e.g., first user 110) to obtain one or more products in the virtual environment 102 or real-world environment. As shown in FIG. 1, virtual-world server 150 may be configured to store one or more experience themes 174, wherein each experience theme 174 relates to a particular type of experience that can be had by the user 110 in the virtual environment 102 or the real-world environment. An example of an experience theme associated with the virtual environment 102 may include visual elements that make up the virtual environment 102. An example of an experience theme associated with the real-world environment may include a travel experience. An experience theme 174 includes one or more product types 176, wherein each product type 176 is a type of product 178 that relates to the experience theme 174. For example, when the experience theme 174 relates to visual experience of the first user 110 within the virtual environment 102, example product types 176 associated with this experience theme 174 may include, but are not limited to, avatars, buildings, roads, objects, colors and patterns. In another example, when the experience theme 174 relates to a travel experience in the real-world environment, product types 176 associated with this experience theme 174 may include, but are not limited to, cars, buses, trains, travel destinations, hotels, restaurants, and excursions. An experience theme 174 may include several products 178 associated with each product type 176. For example, when the experience theme 174 relates to a visual experience within the virtual environment 102, the "avatars" product type 176 may include several specific avatars 114 that may be used as the first avatar 114 of the first user 110 within the virtual environment 102. The "buildings" product type 176 may include a plurality of specific virtual buildings that can be used to generate the virtual environment 102. The "colors" and "patterns" product type 176 may include a plurality of colors and patterns respectively that can be used to render specific objects or portions of the virtual environment 102. When the experience theme 174 relates to a travel experience in the real-world environment, the "destination" product type 176 may include a selection of different destinations, the "cars" product type 176 may include a selection of different cars that be obtained for a travel, the "hotels" product type may include a selection of hotels at the selected destination and the like.

In operation, when the first user 110 enters the virtual environment (e.g., using first avatar 114) after logging in to the virtual-world server 150 by providing user credential 170, the first user 110 may navigate to a virtual sub-environment 120 that is configured to facilitate users to obtain products 178 associated with one or more experience themes 174. The virtual sub-environment 120 may be assigned to a particular real-world entity. Once the first user 110 has entered the virtual sub-environment 120, the virtual-world server 150 may present to the first user 110 one or more experience themes 174. For example, the virtual-world server 150 may display the experience themes 174 on a virtual display within the virtual sub-environment 120. Virtual-world server 150 may be configured to allow the first user 110 to select one of the presented experience themes 174. The first user 110 may select one of the experience themes 174 depending on what kind of experience the first user 110 is looking for. For example, the virtual-world server 150 may present a visual experience theme associated with the virtual environment 102 and a travel experience theme associated with the real-world environment. In this example, the first user 110 selects the visual experience theme associated with the virtual environment 102. Certain embodiments of the present disclosure will now be described in accordance with an example in which the first user 110 selects the visual experience theme as an experience theme 174. However, it may be noted that these embodiments apply in relation to other experience themes 174.

Once the virtual-world server 150 receives a selection of an experience theme 174, virtual-world server 150 may be configured to present to the first user 110 within the virtual sub-environment 120, one or more product types 176 associated with the selected experience theme 174. For example, when the first user 110 selects the visual experience theme as the selected experience theme 174, virtual-world server 150 presents a list of product types 176 associated with the visual experience theme including, but not limited to, avatars, buildings, roads, objects, colors and patterns. Virtual-world server 150 may be configured to allow the first user 110 to select one or more of the presented product types 176 associated with the selected experience theme 174. As the first user 110 selects each product type 176, virtual-world server 150 may be configured to access from the memory 156 one or more products 178 associated with the selected product type 176 and present the product 178 to the first user 110 in the virtual environment 102. For example, when the first user 110 selects the "avatars" product type 177, virtual-world server 150 may access from the memory 156 one or more specific avatars associated with the "avatars" product type 176 and present the one or more specific avatars to the first user 110 in the virtual-sub environment 120. For example, virtual-world server 150 may display a 2-dimensional or 3-dimensional image of one or more avatars associated with the avatar product type 176. Virtual-world server 150 may allow the first user 110 to select at least one product 178 (e.g., specific avatar) associated with a selected product type 176. In one embodiment, virtual-world server 150 may allow the first user 110 to select multiple product types 176 related to the selected experience theme 174 and one or more products 178 associated with each of the multiple selected product types 176. For example, the first user 110 may want to build a customized virtual sub-environment 120 and may want to obtain specific visual elements (e.g., avatars, buildings, roads, objects, colors, patterns etc.) to build the virtual sub-environment 120. For this purpose, the first user 110 may select a specific avatar from the "avatar" product type 176, one or more specific buildings from the "buildings" product type 176, one or more roads from the "roads" product type 176, one or more colors from the "colors" product type 176, and one or more patterns from the "patterns" product type 176.

Once the product selections have been made by the first user 110, virtual-world server 150 may be configured to determine one or more data files (e.g., real-world data files 138 or virtual data files 160) that can be used to obtain at least one of the products 178 selected by the first user 110. In this context, virtual-world server 150 may be configured to store information relating to a plurality of real-world data files 138 and virtual data files 160 that may be used by the first user 110 to obtain products 178 associated with experience themes 174. A particular product 178 may be obtained by the first user 110 by transferring a pre-configured amount of real-world data objects 140 from a real-world data file 138 registered to the first user 110 to another real-world data file 138 registered to an entity that provides the particular product 178, and/or by transferring a pre-configured amount of virtual data objects 162 from a virtual data file 160 registered to the first user 110 to another virtual data file 160 registered to the entity that provides the particular product 178. Different products 178 may be obtained by transferring different pre-configured amounts of real-world data objects 140 or virtual data objects 162 to respective data files of entities that provide the products 178. For example, a first product 178 may be obtained by the first user 110 by transferring a first pre-configured amount of real-world data objects 140 or virtual data objects 162, and a second product 178 may be obtained by the first user 110 by transferring a second pre-configured amount of real-world data objects 140 or virtual data objects 162.

In some embodiments, a single data file (e.g., real-world data file 138 or virtual data file 160) may be used to obtain multiple products 178. In some embodiments, any one of multiple data files (e.g., multiple real-world data file 138, multiple virtual data files 160 or combinations thereof) may be used to obtain a same product 178.

In one or more embodiments, a data file (e.g., real-world data file 138 or virtual data file 160) may provide a benefit count 142/164 to the first user 110, when the first user 110 uses the data file (e.g., real-world data file 138 or virtual data file 160) to obtain a particular product 178 (e.g., by transferring data objects to a respective data file of an entity that provides the particular product 178). For example, the first user 110 may receive a pre-configured benefit count 142 when the first user 110 uses a particular real-world data file 138 to obtain a particular product 178. Similarly, the first user 110 may receive a pre-configured benefit count 164 when the first user 110 uses a particular virtual data file 160 to obtain a particular product 178. In one embodiment, different data files (e.g., different real-world data files 138 and/or different virtual data files 160) may provide different benefit counts 142/164 to obtain a same product 178. In an additional or alternative embodiment, a single data file (e.g., real-world data file 138 or virtual data file 160) may provide different benefit counts 132/164 to obtain different products 178.

In one or more embodiments, benefit count 142 associated with a real-world data file 138 may be used to obtain one or more products 178 in the real-world environment, and benefit count 164 associated with a virtual data file 160 may be used to obtain one or more products 178 in the virtual environment 102. A higher benefit count 142/164 generally allows the first user 110 to obtain more products 178. Thus, a higher benefit count 142/164 is generally of higher value. The first user 110 may accumulate benefit counts 142/164 received as a result of using a particular data file (e.g., real-world data file 138 or virtual data file 160) to obtain several products 178.

The information stored by the virtual-world server 150 in memory 156 relating to a plurality of real-world data files 138 and virtual data files 160 that may be used to obtain products 178 associated with experience themes 174 may include one or more of an identity of each real-world data file 138 or virtual data file 160, products 178 that may be obtained using the real-world data file 138 or the virtual data file 160, and benefit counts 142 or 164 provided by the real-world data file 138 or virtual data file 160 respectively when used to obtain each of the products 178.

As described above, once the selection of the products 178 associated with a selected experience theme 174 has been made by the first user 110, virtual-world server 150 may be configured to determine one or more data files (e.g., real-world data files 138 or virtual data files 160) that can be used to obtain one or more of the products 178 selected by the first user 110. For a selected product 178, virtual-world server 150 determines one or more data files (e.g., real-world data file 138 and/or virtual data file 160) that may be used to obtain the product 178, and a benefit count 142/164 corresponding to each of the one or more data files that the first user 110 may receive when the data file (e.g., real-world data file 138 or virtual data file 160) is used to obtain the product 178. For example, based on the selected product 178, virtual-world server 150 may be configured to search the memory 156 (e.g., information related to data files stored in the memory 156) for data files (e.g., real-world data file 138 and/or virtual data file 160) that can be used to obtain the selected product 178. Based on the search, virtual-world server 150 may determine one or more data files (e.g., real-world data file 138 and/or virtual data file 160) that may be used to obtain the product 178, and a benefit count 142/164 corresponding to each of the one or more data files that the first user 110 may receive when the data file (e.g., real-world data file 138 or virtual data file 160) is used to obtain the product 178.

The virtual-world server 150 may be configured to indicate to the first user 110 in the virtual environment 102 (e.g., within the virtual sub-environment 120) that the determined one or more data files (e.g., real-world data file 138 and/or virtual data file 160) may provide to the first user 110 the corresponding benefit counts 142/164 when the determined one or more data files are used to obtain the product 178. For example, virtual-world server 150 may display in the virtual environment 102 (e.g. within the virtual sub-environment 120) an identity of each of the one or more data files (e.g., real-world data file 138 and/or virtual data file 160) that can be used to obtain the selected product 178, and the corresponding benefit count 142/164 that may be received by the first user 110 when the data file (e.g., real-world data file 138 or virtual data file 160) is used to obtain the selected product 178. In one embodiment, virtual-world server 150 may additionally indicate to the first user 110 in the virtual environment 102 (e.g., virtual sub-environment 120) an amount of real-world data objects 140 or virtual data objects 162 that are to be transferred to a corresponding target real-world data file 138 or a target virtual data file 160 respectively to obtain the selected product 178.

In certain embodiments, based on searching the information relating to data files stored in the memory 156, virtual-world server 150 may determine multiple data files (e.g., multiple real-world data file 138, multiple virtual data files 160 or combinations thereof) that may be used to obtain a same selected product 178. In this case, different ones of the multiple data files 160 may provide different benefit counts 142/164 when used to obtain the same selected product 178. The virtual-world server 150 may be configured to indicate to the first user 110 in the virtual environment 102 (e.g., within the virtual sub-environment 120) identities of each of the multiple data files (e.g., real-world data file 138 and/or virtual data file 160) that can be used to obtain the selected product 178, and a benefit count 142/164 corresponding to each of the data files that the first user 110 may receive when the data file is used to obtain the product 178. In one embodiment, virtual-world server 150 may additionally indicate to the first user 110 in the virtual environment 102 (e.g., virtual sub-environment 120) an amount of real-world data objects 140 or virtual data objects 162 that are to be transferred to a corresponding target real-world data file 138 or a target virtual data file 160 respectively to obtain the selected product 178.

In certain embodiments, when a selected product type 176 is associated with multiple products 178 that are available for selection, virtual-world server 150 may determine a single data file (e.g., real-world data file 138 or virtual data file 160) that may be used to obtain several products 178 of the same selected product type 176 including the product 178 selected by the first user 110 of the same selected product type 176. In this case, the single data file may provide different benefit counts 142/164 when used to obtain the different products 178 of the selected product type 176. The virtual-world server 150 may be configured to indicate to the first user 110 in the virtual environment 102 (e.g., within the virtual sub-environment 120) an identity of the single data file (e.g., real-world data file 138 or virtual data file 160) that can be used to obtain each of the multiple products 178 associated with the selected product type 176, one or more of the multiple products 178 (e.g., including the selected product 178) associated with the selected product type 176, and for each indicated product 178, a benefit count 142/164 corresponding to the data file that the first user 110 may receive when the data file is used to obtain the product 178. In one embodiment, virtual-world server 150 may additionally indicate to the first user 110 in the virtual environment 102 (e.g., virtual sub-environment 120) an amount of real-world data objects 140 or virtual data objects 162 that are to be transferred to a corresponding target real-world data file 138 or a target virtual data file 160 respectively to obtain each of the multiple products 178.

In alternative or additional embodiments, in response to receiving a selection of a product type 176 associated with a particular selected experience theme 174, virtual-world server 150 may be configured to search the memory 156 and determine one or more products 178 that are available for selection associated with each selected product type 176. For each product 178 that is available for selection, virtual-world server 150 may be configured to search the information relating to data files (e.g., real-world data file 138 and/or virtual data file 160) stored in the memory 156 to determine one or more data files (e.g., real-world data file 138 and/or virtual data file 160) that can be used to obtain the product 178 and a benefit count 142/164 corresponding to each determined data file that the first user 110 may receive when the data file is used to obtain the product 178. In one embodiment, virtual-world server 150 may determine different data files (e.g., real-world data file 138 and/or virtual data file 160) that may be used to obtain different products 178 belonging to the same product type 176. For example, virtual-world server 150 may determine a first data file (e.g., real-world data file 138 or virtual data file 160) that may be used to obtain a first product 178 belonging to a product type 176 and determine a second data file (e.g., real-world data file 138 or virtual data file 160) that may be used to obtain a second product 178 belonging to the same product type 176. The first data file may provide a first benefit count 142/164 when used to obtain the first product 178, and the second data file may provide a second benefit count 142/164 when used to obtain the second product 178.

The virtual-world server 150 may be configured to indicate to the first user 110 in the virtual environment 102 (e.g., within the virtual sub-environment 120) each of one or more products 178 that is available for selection associated with the selected product type 176, identities of one or more data files (e.g., real-world data file 138 and/or virtual data file 160) that can be used to obtain the product 178, and a benefit count 142/164 corresponding to each of the one or more data files that the first user 110 may receive when the data file is used to obtain the product 178. In one embodiment, virtual-world server 150 may additionally indicate to the first user 110 in the virtual environment 102 (e.g., virtual sub-environment 120) an amount of real-world data objects 140 or virtual data objects 162 that are to be transferred to a corresponding target real-world data file 138 or a target virtual data file 160 respectively to obtain each product 178.

Virtual-world server 150 may be configured to generate a customized virtual experience for the first user 110 based on a selection of one or more products 178 made by the first user 110 in respective product types 176 of an experience theme 174. In one embodiment, the virtual experience simulates an actual experience that the first user 110 may have when using the selected products 178 and thus allows the first user 110 to experience the selected products 178 before obtaining the products 178 by transferring data objects (e.g., real-world data objects 140 or virtual data objects 162) to respective entities that provide the products 178. For example, when the first user 110 selects an experience theme 174 relating to a visual experience in the virtual environment 102 as described above, the first user 110 may select several products 178 associated with multiple product types 176. For example, the first user 110 may select a particular avatar as a selected product 178 from the "avatars" product type 176, one or more buildings selected products 178 from the "buildings" product type 176, and one or more roads as a selected products 178 from the "roads" product type 176. In response to receiving these product selections, virtual-world server 150 may generate a customized virtual sub-environment 120 that simulates a visual experience of the virtual environment 102 using the selected avatar, buildings, and roads. Virtual-world server 150 may allow the first user 110 to navigate the customized virtual sub-environment 120 to experience the simulated visual experience generated for the first user 110. In another example, when the first user 110 selects a travel theme as the selected experience theme 174, the first user 110 may select a particular destination (e.g. city or town) as a selected product 178 from the "destination" product type 176, a particular car as a selected product 178 from the "car" product type 176, a particular hotel as a selected product 178 from the "hotels" product type 176, and a particular excursion as a selected product 178 from the "excursions" product type 176. In response to receiving these product selections associated with the travel theme, virtual-world server 150 may generate a customized virtual sub-environment 120 that simulates a travel experience of the virtual environment 102 using the selected destination, car, hotel and excursion. Virtual-world server 150 may allow the first user 110 to navigate the customized virtual sub-environment 120 to experience the simulated travel experience generated for the first user 110.

Virtual-world server 150 may be configured to allow the first user 110 (e.g., using first avatar 114) to select one or more data files (e.g. real-world data file 138 and/or virtual data file 160). For example, in response to indicating to the user in the virtual environment 102 (e.g., virtual sub-environment 120) one or more data files (e.g. real-world data file 138 and/or virtual data file 160) that can be used to obtain one or more products 178 associated with an experience theme 174 selected by the first user 110, first user 110 may select a data file (e.g. real-world data file 138 or virtual data file 160). Upon receiving a selection of the data file from the first user 110, virtual-world server 150 may be configured to initiate a registration process to register the first user 110 to obtain the selected data file. In one embodiment, when the data file selected by the first user 110 is a real-world data file 138, the virtual-world server 150 may be configured to transmit a request to the real-world server 130 to take over and register the first user 110 to obtain the real-world data file 138. On the other hand, when the data file selected by the first user 110 is a virtual data file 160, the virtual-world server 150 may be configured to register the first user 110 obtain the real-world data file 138. As described above, registering the first user 110 may include verifying the identity of the first user 110 and then generating the selected data file (e.g. real-world data file 138 or virtual data file 160) for the first user 110. Once a selected real-world data file 138 or a selected virtual data file 160 has been generated for the first user 110, the first user 110 may store real-world data objects 140 or virtual data objects 162 in the respective real-world data file 138 or a selected virtual data file 160. In one embodiment, the real-world server 130 or the virtual-world server 150 may transfer a default or pre-configured amount of real-world data objects 140 or virtual data objects 162 to the respective real-world data file 138 or a selected virtual data file 160.

Once the first user 110 is registered for the selected data file (real-world data file 138 or virtual data file 160) and the selected data file has been generated and stored at the respective real-world server 130 or virtual-world server 150, first user 110 may use the data file to obtain one or more products 178. For example, when a selected product 178 is a real-world product (e.g., car, train, hotel etc.), the first user 110 may obtain the selected product 178 by commanding the real-world server 130 to transfer a pre-configured amount of real-world data objects 140 from the registered real-world data file 138 of the first user 110 to a target real-world data file 138 of an entity that provides the selected product 178. On the other hand, when a selected product 178 is a virtual-world product (e.g., avatar, virtual building, virtual roads, etc.), the first user 110 may obtain the selected product 178 by commanding the virtual-world server 150 to transfer a pre-configured amount of virtual data objects 162 from the registered virtual data file 160 of the first user 110 to a target virtual data file 160 of an entity that provides the selected product 178 in the virtual environment 102. In response to receiving the command from the first user 110, the respective real-world server 130 or the virtual-world server 150 may transfer the pre-configured amount of data objects to the target data file, to cause the transfer of the selected product 178 to the first user 110 in the real-world environment or the virtual environment 102 whichever the case may be.

In certain embodiment, before initiating registration of the first user 110 to obtain a selected data file (real-world data file 138 or virtual data file 160), the virtual-world server may be configured to determine whether the first user 110 is eligible to obtain the requested data file. As described above, the virtual-world server 150 may store a user profile 172 associated with the first user 110. Virtual-world server 150 may be configured to determine whether the first user 110 is eligible to obtain the selected data file based on the information stored in the user profile 172 associated with the first user 110. The virtual-world server 150 initiates registration of the first user 110 to obtain the selected data file upon determining that first user 110 is eligible to obtain the selected data file.

In some embodiments, the first user 110 may be registered with a first entity that owns and/or manages the virtual environment 102 but may not be registered with a second entity that provides the data files (real-world data file 138 or virtual data file 160). For example, based on the registration with the first entity, the first user 110 may have generated a user credential 170 that allows the first user 110 to enter the virtual environment 102. The first user 110 may have provided some information (e.g., name, email address, social security number, phone number etc.) when registering with the first entity. This information may be stored as part of the user profile 172 of the first user 110 and associated with the user credential 170 of the first user 110. When the first user 110 selects a data file (real-world data file 138 or virtual data file 160) for registration, the virtual-world server 150 obtains the user profile 172 of the first user 110 associated with the user credential 170 and determines whether the first user is eligible to obtain the selected data file based on information stored in the user profile 172.

FIG. 3 illustrates a flowchart of an example method 300 for performing data interactions in a virtual environment 102, in accordance with one or more embodiments of the present disclosure. Method 300 may be performed by the virtual-world server 150 shown in FIG. 1.

At operation 302, virtual-world server 150 receives a user credential 170 associated with a first user 110, wherein the ser credential 170 provides the first user 110 access to a virtual environment 102.

At operation 304, virtual-world server 150 checks whether the user credential 170 is registered at the virtual-world server 150 to provide the first user 110 access to the virtual environment 102. For example, the virtual environment 102 may be owned and/or managed by a first entity. In this case, the first user 110 may need to be registered with the first entity to gain access to the virtual environment 102. If the first user 110 is registered with the first entity, this registration may be stored at the virtual-world server 150 including the user credential 170 that was registered with the first entity to gain access to the virtual environment 102. If the first user 110 is found to be not authorized to access the virtual environment 102 based on the user credential 170, method 300 proceeds to operation 306 where the virtual-world server 150 denies the first user 110 access to the virtual environment 102. On the other hand, if the first user 110 is found to be authorized to access the virtual environment 102, method 300 proceeds to operation 308, where the virtual-world server 150 authorizes, an avatar (e.g., first avatar 114) of the first user 110 to enter the virtual environment 102.

As described above, virtual-world server 150 may be configured to use the user credential 170 collected from the first user 110, generated by the first user 110 or assigned to the first user 110 during real-world data interactions with the first user 110, to verify identity of the first user 110 in the virtual environment 102. Thus, the user credential 170 provides the first user 110 access to the virtual environment 102. For example, the user credential 170 may be used by the virtual-world server 150 to verify that the first avatar 114 belongs to and is controlled by the first user 110.

In one example, user credential 170 may include a username and password generated by the first user 110 as part of registering with the real-world server 130. The virtual-world server 150 may allow the first user 110 to use the same username and password to enter the virtual environment 102 via first avatar 114. In an alternative embodiment, the first user 110 may generate a separate user credential (different from the first user credential 170) as part of registering with the real-world server 130 and use the separate user credential to log into the real-world server 130 and perform real-world data interaction. The first user 110 may separately generate the user credential 170 as part of registering with the virtual-world server 150 (e.g., including registering with a first entity that owns and/or manages the virtual environment 102), for example, during a real-world data interaction with the real-world server 130. Once the first user 110 has registered with the virtual-world server 150 and generated the user credential 170, the first user 110 may use the user credential 170 to log into the virtual-world server 150, gain access to the virtual environment 102 and perform virtual-world data interactions in within the virtual environment 102.

At operation 310, virtual-world server 150 receives a first selection made by the first user 110 of an experience theme 174 using the avatar (e.g., first avatar 114) in the virtual environment 102, wherein the experience theme 174 includes a plurality of selectable product types 176.

As described above, virtual-world server 150 may be configured to facilitate a user (e.g., first user 110) to obtain one or more products 178 in the virtual environment 102 or real-world environment. As shown in FIG. 1, virtual-world server 150 may be configured to store one or more experience themes 174, wherein each experience theme 174 relates to a particular type of experience that can be had by the user 110 in the virtual environment 102 or the real-world environment. An example of an experience theme associated with the virtual environment 102 may include visual elements that make up the virtual environment 102. An example of an experience theme associated with the real-world environment may include a travel experience. An experience theme 174 includes one or more product types 176, wherein each product type 176 is a type of product 178 that relates to the experience theme 174. For example, when the experience theme 174 relates to visual experience of the first user 110 within the virtual environment 102, example product types 176 associated with this experience theme 174 may include, but are not limited to, avatars, buildings, roads, objects, colors and patterns. In another example, when the experience theme 174 relates to a travel experience in the real-world environment, product types 176 associated with this experience theme 174 may include, but are not limited to, cars, buses, trains, travel destinations, hotels, restaurants, and excursions. An experience theme 174 may include several products 178 associated with each product type 176. For example, when the experience theme 174 relates to a visual experience within the virtual environment 102, the "avatars" product type 176 may include several designs of avatars 114 that may be used as the first avatar 114 of the first user 110 within the virtual environment 102. The "buildings" product type 176 may include a plurality of virtual buildings that can be used to generate the virtual environment 102. The "colors" and "patterns" product type 176 may include a plurality of colors and patterns respectively that can be used to render specific objects or portions of the virtual environment 102. When the experience theme 174 relates to a travel experience in the real-world environment, the "destination" product type 176 may include a selection of different destinations (e.g., cities, towns etc.) the first user 110 may visit, the "cars" product type 176 may include a selection of different cars that be obtained for a travel, the "hotels" product type may include a selection of hotels at the selected destination and the like.

When the first user 110 enters the virtual environment 102 (e.g., using first avatar 114) after logging in to the virtual-world server 150 by providing user credential 170, the first user 110 may navigate to a virtual sub-environment 120 that is configured to facilitate users to obtain products 178 associated with one or more experience themes 174. The virtual sub-environment 120 may be assigned to a particular real-world entity. Once the first user 110 has entered the virtual sub-environment 120, the virtual-world server 150 may present to the first user 110 one or more experience themes 174. For example, the virtual-world server 150 may display the experience themes 174 on a virtual display within the virtual sub-environment 120. Virtual-world server 150 may be configured to allow the first user 110 to select one of the presented experience themes 174. The first user 110 may select one of the experience themes 174 depending on what kind of experience the first user 110 is looking for. For example, the virtual-world server 150 may present a visual experience theme associated with the virtual environment 102 and a travel experience theme associated with the real-world environment. In an example, the first user 110 selects the visual experience theme associated with the virtual environment 102.

At operation 312, virtual-world server 150 receives a second selection made by the first user 110 in the virtual environment 102 of at least one product type 176 from the selected experience theme 174, wherein a first product 178 associated with the selected at least one product type 176 can be obtained by the first user 110 by transferring a first amount of data objects (e.g., real-world data objects 140 and/or virtual data objects 162) to a first entity that provides the first product 178.

As described above, once the virtual-world server 150 receives a selection of an experience theme 174, virtual-world server 150 may be configured to present to the first user 110 within the virtual sub-environment 120, one or more product types 176 associated with the selected experience theme 174. For example, when the first user 110 selects visual experience in the virtual environment 102 as the selected experience theme 174, virtual-world server 150 presents a list of product types 176 associated with the visual experience theme including, but not limited to, avatars, buildings, roads, objects, colors and patterns. Virtual-world server 150 may be configured to allow the first user 110 to select one or more of the presented product types 176 associated with the selected experience theme 174. As the first user 110 selects each product type 176, virtual-world server 150 may be configured to access from the memory 156 one or more products 178 associated with the selected product type 176 and present the one or more products 178 to the first user 110 in the virtual environment 102. For example, when the first user 110 selects the "avatars"

product type 176, virtual-world server 150 may access from the memory 156 one or more avatar designs associated with the "avatars" product type 176 and present the one or more avatar designs to the first user 110 in the virtual-sub environment 120. For example, virtual-world server 150 may display a 2-dimensional or 3-dimensional image of one or more avatars associated with the avatar product type 176. Virtual-world server 150 may allow the first user 110 to select at least one product 178 (e.g., specific avatar design) associated with a selected product type 176. In one embodiment, virtual-world server 150 may allow the first user 110 to select multiple product types 176 related to the selected experience theme 174 and one or more products 178 associated with each of the multiple selected product types 176. For example, the first user 110 may want to build a customized virtual sub-environment 120 and may want to obtain specific visual elements (e.g., avatars, buildings, roads, objects, colors, patterns etc.) to build the virtual sub-environment 120. For this purpose, the first user 110 may select a specific avatar from the "avatar" product type 176, one or more specific buildings from the "buildings" product type 176, one or more roads from the "roads" product type 176, one or more colors from the "colors" product type 176, and one or more patterns from the "patterns" product type 176.

At operation 314, virtual-world server 150 determines a first data file (e.g., real-world data file 138 or virtual data file 160) that provides a first benefit count (e.g., benefit count 142/164) to the first user 110 when the first amount of data objects (e.g., real-world data objects 140 or virtual data objects 162) is transferred from the first data file to a second data file (e.g., another real-world data file 138 or virtual data file 160) associated with the first entity to obtain the first product 178 associated with the selected at least one product type 176.

As described above, once the product selections have been made by the first user 110, virtual-world server 150 may be configured to determine one or more data files (e.g., real-world data files 138 and/or virtual data files 160) that can be used to obtain at least one of the products 178 selected by the first user 110. In this context, virtual-world server 150 may be configured to store information relating to a plurality of real-world data files 138 and virtual data files 160 that may be used by the first user 110 to obtain products 178 associated with experience themes 174. A particular product 178 may be obtained by the first user 110 by transferring a pre-configured amount of real-world data objects 140 from a real-world data file 138 registered to the first user 110 to another real-world data file 138 registered to an entity that provides the particular product 178, and/or by transferring a pre-configured amount of virtual data objects 162 from a virtual data file 160 registered to the first user 110 to another virtual data file 160 registered to the entity that provides the particular product 178. Different products 178 may be obtained by transferring different pre-configured amounts of real-world data objects 140 or virtual data objects 162 to respective data files of entities that provide the products 178. For example, a first product 178 may be obtained by the first user 110 by transferring a first pre-configured amount of real-world data objects 140 or virtual data objects 162, and a second product 178 may be obtained by the first user 110 by transferring a second pre-configured amount of real-world data objects 140 or virtual data objects 162.

In some embodiments, a single data file (e.g., real-world data file 138 or virtual data file 160) may be used to obtain multiple products 178. In some embodiments, any one of multiple data files (e.g., multiple real-world data file 138, multiple virtual data files 160 or combinations thereof) may be used to obtain a same product 178.

In one or more embodiments, a data file (e.g., real-world data file 138 or virtual data file 160) may provide a benefit count 142/164 to the first user 110, when the first user 110 uses the data file (e.g., real-world data file 138 or virtual data file 160) to obtain a particular product 178 (e.g., by transferring data objects from the data file to a respective data file of an entity that provides the particular product 178). For example, the first user 110 may receive a pre-configured benefit count 142 when the first user 110 uses a particular real-world data file 138 to obtain a particular product 178. Similarly, the first user 110 may receive a pre-configured benefit count 164 when the first user 110 uses a particular virtual data file 160 to obtain a particular product 178. In one embodiment, different data files (e.g., different real-world data files 138 and/or different virtual data files 160) may provide different benefit counts 142/164 to obtain a same product 178. In an additional or alternative embodiment, a single data file (e.g., real-world data file 138 or virtual data file 160) may provide different benefit counts 132/164 to obtain different products 178.

In one or more embodiments, benefit count 142 associated with a real-world data file 138 may be used to obtain one or more products 178 in the real-world environment, and benefit count 164 associated with a virtual data file 160 may be used to obtain one or more products 178 in the virtual environment 102. A higher benefit count 142/164 generally allows the first user 110 to obtain more products 178. Thus, a higher benefit count 142/164 is generally of higher value. The first user 110 may accumulate benefit counts 142/164 received as a result of using a particular data file (e.g., real-world data file 138 or virtual data file 160) to obtain several products 178.

The information stored by the virtual-world server 150 in memory 156 relating to a plurality of real-world data files 138 and virtual data files 160 that may be used to obtain products 178 associated with experience themes 174 may include one or more of an identity of each real-world data file 138 or virtual data file 160, products 178 that may be obtained using the real-world data file 138 or the virtual data file 160, and benefit counts 142 or 164 provided by the real-world data file 138 or virtual data file 160 respectively when used to obtain each of the products 178.

As described above, once the selection of the products 178 associated with a selected experience theme 174 has been made by the first user 110, virtual-world server 150 may be configured to determine one or more data files (e.g., real-world data files 138 or virtual data files 160) that can be used to obtain one or more of the products 178 selected by the first user 110. For a selected product 178, virtual-world server 150 determines one or more data files (e.g., real-world data file 138 and/or virtual data file 160) that may be used to obtain the product 178, and a benefit count 142/164 corresponding to each of the one or more data files that the first user 110 may receive when the data file (e.g., real-world data file 138 or virtual data file 160) is used to obtain the product 178. For example, based on the selected product 178, virtual-world server 150 may be configured to search the memory 156 (e.g., information related to data files stored in the memory 156) for data files (e.g., real-world data file 138 and/or virtual data file 160) that can be used to obtain the selected product 178. Based on the search, virtual-world server 150 may determine one or more data files (e.g., real-world data file 138 and/or virtual data file 160) that may be used to obtain the product 178, and a benefit count 142/164 corresponding to each of the one or more data files that the first user 110 may receive when the data file (e.g., real-world data file 138 or virtual data file 160) is used to obtain the product 178.

At operation 316, virtual-world server 150 indicates to the first user 110 in the virtual environment 102 that the first data file (e.g., real-world data file 138 or virtual data file 160) provides the first benefit count 142/164 to the first user 110 in relation to obtaining the first product 178 associated with the selected at least one product type 176, wherein the indication comprises the first benefit count 142/164.

The virtual-world server 150 may be configured to indicate to the first user 110 in the virtual environment 102 (e.g., within the virtual sub-environment 120) that the determined one or more data files (e.g., real-world data file 138 and/or virtual data file 160) may provide to the first user 110 the corresponding benefit counts 142/164 when the determined one or more data files are used to obtain the product 178. For example, virtual-world server 150 may display in the virtual environment 102 (e.g. within the virtual sub-environment 120) an identity of each of the one or more data files (e.g., real-world data file 138 and/or virtual data file 160) that can be used to obtain the selected product 178, and the corresponding benefit count 142/164 that may be received by the first user 110 when the data file (e.g., real-world data file 138 or virtual data file 160) is used to obtain the selected product 178. In one embodiment, virtual-world server 150 may additionally indicate to the first user 110 in the virtual environment 102 (e.g., virtual sub-environment 120) an amount of real-world data objects 140 or virtual data objects 162 that are to be transferred to a corresponding target real-world data file 138 or a target virtual data file 160 respectively to obtain the selected product 178.

In certain embodiments, based on searching the information relating to data files stored in the memory 156, virtual-world server 150 may determine multiple data files (e.g., multiple real-world data file 138, multiple virtual data files 160 or combinations thereof) that may be used to obtain a same selected product 178. In this case, different ones of the multiple data files 160 may provide different benefit counts 142/164 when used to obtain the same selected product 178. The virtual-world server 150 may be configured to indicate to the first user 110 in the virtual environment 102 (e.g., within the virtual sub-environment 120) identities of each of the multiple data files (e.g., real-world data file 138 and/or virtual data file 160) that can be used to obtain the selected product 178, and a benefit count 142/164 corresponding to each of the data files that the first user 110 may receive when the data file is used to obtain the product 178. In one embodiment, virtual-world server 150 may additionally indicate to the first user 110 in the virtual environment 102 (e.g., virtual sub-environment 120) an amount of real-world data objects 140 or virtual data objects 162 that are to be transferred to a corresponding target real-world data file 138 or a target virtual data file 160 respectively to obtain the selected product 178.

In certain embodiments, when a selected product type 176 is associated with multiple products 178 that are available for selection, virtual-world server 150 may determine a single data file (e.g., real-world data file 138 or virtual data file 160) that may be used to obtain several products 178 of the same selected product type 176 including the product 178 selected by the first user 110 of the same selected product type 176. In this case, the single data file may provide different benefit counts 142/164 when used to obtain the different products 178 of the selected product type 176. The virtual-world server 150 may be configured to indicate to the first user 110 in the virtual environment 102 (e.g., within the virtual sub-environment 120) an identity of the single data file (e.g., real-world data file 138 or virtual data file 160) that can be used to obtain each of the multiple products 178 associated with the selected product type 176, one or more of the multiple products 178 (e.g., including the selected product 178) associated with the selected product type 176, and for each indicated product 178, a benefit count 142/164 corresponding to the data file that the first user 110 may receive when the data file is used to obtain the product 178. In one embodiment, virtual-world server 150 may additionally indicate to the first user 110 in the virtual environment 102 (e.g., virtual sub-environment 120) an amount of real-world data objects 140 or virtual data objects 162 that are to be transferred to a corresponding target real-world data file 138 or a target virtual data file 160 respectively to obtain each of the multiple products 178.

In alternative or additional embodiments, in response to receiving a selection of a product type 176 associated with a particular selected experience theme 174, virtual-world server 150 may be configured to search the memory 156 and determine one or more products 178 that are available for selection associated with each selected product type 176. For each product 178 that is available for selection, virtual-world server 150 may be configured to search the information relating to data files (e.g., real-world data file 138 and/or virtual data file 160) stored in the memory 156 to determine one or more data files (e.g., real-world data file 138 and/or virtual data file 160) that can be used to obtain the product 178 and a benefit count 142/164 corresponding to each determined data file that the first user 110 may receive when the data file is used to obtain the product 178. In one embodiment, virtual-world server 150 may determine different data files (e.g., real-world data file 138 and/or virtual data file 160) that may be used to obtain different products 178 belonging to the same product type 176. For example, virtual-world server 150 may determine a first data file (e.g., real-world data file 138 or virtual data file 160) that may be used to obtain a first product 178 belonging to a product type 176 and determine a second data file (e.g., real-world data file 138 or virtual data file 160) that may be used to obtain a second product 178 belonging to the same product type 176. The first data file may provide a first benefit count 142/164 when used to obtain the first product 178, and the second data file may provide a second benefit count 142/164 when used to obtain the second product 178.

The virtual-world server 150 may be configured to indicate to the first user 110 in the virtual environment 102 (e.g., within the virtual sub-environment 120) each of one or more products 178 that is available for selection associated with the selected product type 176, identities of one or more data files (e.g., real-world data file 138 and/or virtual data file 160) that can be used to obtain the product 178, and a benefit count 142/164 corresponding to each of the one or more data files that the first user 110 may receive when the data file is used to obtain the product 178. In one embodiment, virtual-world server 150 may additionally indicate to the first user 110 in the virtual environment 102 (e.g., virtual sub-environment 120) an amount of real-world data objects 140 or virtual data objects 162 that are to be transferred to a corresponding target real-world data file 138 or a target virtual data file 160 respectively to obtain each product 178.

At operation 318, virtual-world server 150 receives a command from the first user 110 to register the first user 110 to obtain the first data file (e.g., real-world data file 138 or virtual data file 160).

At operation 320, in response to receiving the command, virtual-world server 150 initiates a registration process to register the first user 110 to obtain the first data file (e.g., real-world data file 138 or virtual data file 160).

As described above, virtual-world environment 150 may be configured to allow the first user 110 (e.g., using first avatar 114) to select one or more data files (e.g. real-world data file 138 and/or virtual data file 160). For example, in response to indicating to the user in the virtual environment 102 (e.g., virtual sub-environment 120) one or more data files (e.g. real-world data file 138 and/or virtual data file 160) that can be used to obtain one or more products 178 associated with an experience theme 174 selected by the first user 110, first user 110 may select a data file (e.g. real-world data file 138 or virtual data file 160). Upon receiving a selection of the data file from the first user 110, virtual-world server 150 may be configured to initiate a registration process to register the first user 110 to obtain the selected data file. In one embodiment, when the data file selected by the first user 110 is a real-world data file 138, the virtual-world server 150 may be configured to transmit a request to the real-world server 130 to take over and register the first user 110 to obtain the real-world data file 138. On the other hand, when the data file selected by the first user 110 is a virtual data file 160, the virtual-world server 150 may be configured to register the first user 110 obtain the real-world data file 138. As described above, registering the first user 110 may include verifying the identity of the first user 110 and then generating the selected data file (e.g. real-world data file 138 or virtual data file 160) for the first user 110. Once a selected real-world data file 138 or a selected virtual data file 160 has been generated for the first user 110, the first user 110 may store real-world data objects 140 or virtual data objects 162 in the respective real-world data file 138 or a selected virtual data file 160. In one embodiment, the real-world server 130 or the virtual-world server 150 may transfer a default or pre-configured amount of real-world data objects 140 or virtual data objects 162 to the respective real-world data file 138 or a selected virtual data file 160.

Once the first user 110 is registered for the selected data file (real-world data file 138 or virtual data file 160) and the selected data file has been generated and stored at the respective real-world server 130 or virtual-world server 150, first user 110 may use the data file to obtain one or more products 178. For example, when a selected product 178 is a real-world product (e.g., car, train, hotel etc.), the first user 110 may obtain the selected product 178 by commanding the real-world server 130 to transfer a pre-configured amount of real-world data objects 140 from the registered real-world data file 138 of the first user 110 to a target real-world data file 138 of an entity that provides the selected product 178. On the other hand, when a selected product 178 is a virtual-world product (e.g., avatar, virtual building, virtual roads, etc.), the first user 110 may obtain the selected product 178 by commanding the virtual-world server 150 to transfer a pre-configured amount of virtual data objects 162 from the registered virtual data file 160 of the first user 110 to a target virtual data file 160 of an entity that provides the selected product 178 in the virtual environment 102. In response to receiving the command from the first user 110, the respective real-world server 130 or the virtual-world server 150 may transfer the pre-configured amount of data objects to the target data file, to cause the transfer of the selected product 178 to the first user 110 in the real-world environment or the virtual environment 102 whichever the case may be.

In certain embodiment, before initiating registration of the first user 110 to obtain a selected data file (real-world data file 138 or virtual data file 160), the virtual-world server may be configured to determine whether the first user 110 is eligible to obtain the requested data file. As described above, the virtual-world server 150 may store a user profile 172 associated with the first user 110. Virtual-world server 150 may be configured to determine whether the first user 110 is eligible to obtain the selected data file based on the information stored in the user profile 172 associated with the first user 110. The virtual-world server 150 initiates registration of the first user 110 to obtain the selected data file upon determining that first user 110 is eligible to obtain the selected data file.

In some embodiments, the first user 110 may be registered with a first entity that owns and/or manages the virtual environment 102 but may not be registered with a second entity that provides the data files (real-world data file 138 or virtual data file 160). For example, based on the registration with the first entity, the first user 110 may have generated a user credential 170 that allows the first user 110 to enter the virtual environment 102. The first user 110 may have provided some information (e.g., name, email address, social security number, phone number etc.) when registering with the first entity. This information may be stored as part of the user profile 172 of the first user 110 and associated with the user credential 170 of the first user 110. When the first user 110 selects a data file (real-world data file 138 or virtual data file 160) for registration, the virtual-world server 150 obtains the user profile 172 of the first user 110 associated with the user credential 170 and determines whether the first user is eligible to obtain the selected data file based on information stored in the user profile 172.

In an example banking use case, the disclosed system and methods described in embodiments of the present disclosure provide motivations to a user (e.g., first user 110) to sign up for a bank account (e.g., a credit card). In this context, the real-world data file 138 may correspond to a real-world bank account of the first user 110 and the real-world data objects 140 may correspond to the real-world funds in the bank account of the first user 110. Similarly, virtual data file 160 may correspond to a virtual account (e.g., a crypto account) of the first user 110 and the virtual data objects 162 may correspond to digital currency. Different types of real-world data file 138 may include, but are not limited to, credit card account, debit card account, savings account, and checking account. Benefit count 164 may correspond to reward points that may be earned by the first user 110 when a particular bank account (e.g., credit card or crypto account) is used to purchase a product.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory that stores a user credential associated with a first user; and
at least one processor coupled to the memory, and configured to:
receive the user credential associated with the first user, wherein the user credential provides the first user access to a virtual environment;
authorize, based on the user credential, an avatar of the first user to enter the virtual environment;
receive a first selection made by the first user of an experience theme using the avatar in the virtual environment, wherein the experience theme comprises a plurality of selectable product types;
receive a second selection made by the first user in the virtual environment of at least one product type from the selected experience theme, wherein a first product associated with the selected at least one product type can be obtained by the first user by transferring a first amount of data objects to a first entity that provides the first product;
determine a first data file that provides a first benefit count to the first user when the first amount of data objects is transferred from the first data file to a second data file associated with the first entity to obtain the first product associated with the selected at least one product type;
indicate to the first user in the virtual environment that the first data file provides the first benefit count to the first user in relation to obtaining the first product associated with the selected at least one product type, wherein the indication comprises the first benefit count;
receive a command from the first user to register to obtain the first data file; and
in response to receiving the command, initiate a registration process to register the first user to obtain the first data file.

2. The system of claim 1, wherein the at least one processor is further configured to:
after the user has obtained the first data file, receive a second command from the first user to transfer the first amount of data objects from the first data file to the second data file associated with the entity to obtain the first product; and
in response to receiving the second command, transfer the first amount of data objects from the first data file to the second data file, to cause a transfer of the first product to the first user in a real-world environment.

3. The system of claim 2, wherein the at least one processor is further configured to:
determine whether the first user is registered with a second entity associated with the virtual environment;
if the first user is not registered with the second entity, obtain a user profile of the first user associated with the user credential of the first user;
determine, based on the user profile, whether the first user is eligible to obtain the first data file; and
initiate a registration process to register the first user to obtain the first data file, if the first user is eligible to obtain the first data file.

4. The system of claim 1, wherein the at least one processor is further configured to:
generate a virtual sub-environment within the virtual environment, wherein the virtual sub-environment provides the first user a virtual experience associated with one or more products associated with the selected at least one product type.

5. The system of claim 1, wherein:
the selected experience theme comprises a plurality of products associated with the selected at least one product type;
a second product associated with the selected at least one product type can be obtained by the first user by transferring a second amount of data objects to a second entity that provides the second product; and
the at least one processor is further configured to:
determine a third data file that provides a second benefit count to the first user when the second amount of data objects is transferred from the third data file to a fourth data file of the second entity to obtain the second product associated with the selected at least one product type, wherein the first benefit count is larger than the second benefit count; and
indicate to the first user in the virtual environment that the third data file provides the second benefit count to the first user in relation to obtaining the second product associated with the selected at least one product type, wherein the indication comprises the second benefit count.

6. The system of claim 5, wherein the at least one processor is further configured to:
determine that the first data file provides a third benefit count to the first user when the second number of data objects is transferred from the first data file to the fourth data file of the second entity to obtain the second product associated with the selected at least one product type, wherein the first benefit count is larger than the third benefit count; and
indicate to the first user in the virtual environment that the first data file provides the third benefit count to the first user in relation to obtaining the second product associated with the selected at least one product type, wherein the indication comprises the third benefit count.

7. The system of claim 1, wherein the at least one processor is further configured to:
determine that a third data file provides a second benefit count to the first user when the first amount of data objects is transferred from the third data file to the second data file associated with the first entity to obtain the first product associated with the selected at least one product type, wherein the first benefit count is larger than the second benefit count; and
indicate to the first user in the virtual environment that the third data file provides the second benefit count to the first user in relation to obtaining the first product associated with the selected at least one product type, wherein the indication comprises the second benefit count.

8. The system of claim 1, wherein:
the second selection of the at least one product type comprises:

a third selection of a first product type; and
a fourth selection of a second product type; and
the at least one processor is further configured to:
generate a virtual sub-environment within the virtual environment, wherein the virtual sub-environment provides the first user a virtual experience associated with at least one product associated with the first product type and at least one product associated with the second product type.

9. A method for performing data interactions in a virtual environment, the method comprising:
receiving a user credential associated with the first user, wherein the user credential provides the first user access to a virtual environment;
authorizing, based on the user credential, an avatar of the first user to enter the virtual environment;
receiving a first selection made by the first user of an experience theme using the avatar in the virtual environment, wherein the experience theme comprises a plurality of selectable product types;
receiving a second selection made by the first user in the virtual environment of at least one product type from the selected experience theme, wherein a first product associated with the selected at least one product type can be obtained by the first user by transferring a first amount of data objects to a first entity that provides the first product;
determining a first data file that provides a first benefit count to the first user when the first amount of data objects is transferred from the first data file to a second data file associated with the first entity to obtain the first product associated with the selected at least one product type;
indicating to the first user in the virtual environment that the first data file provides the first benefit count to the first user in relation to obtaining the first product associated with the selected at least one product type, wherein the indication comprises the first benefit count;
receiving a command from the first user to register to obtain the first data file; and
in response to receiving the command, initiating a registration process to register the first user to obtain the first data file.

10. The method of claim 9, further comprising:
after the user has obtained the first data file, receiving a second command from the first user to transfer the first amount of data objects from the first data file to the second data file associated with the entity to obtain the first product; and
in response to receiving the second command, transferring the first amount of data objects from the first data file to the second data file, to cause a transfer of the first product to the first user in a real-world environment.

11. The method of claim 10, further comprising:
determining whether the first user is registered with a second entity associated with the virtual environment;
if the first user is not registered with the second entity, obtaining a user profile of the first user associated with the user credential of the first user;
determining, based on the user profile, whether the first user is eligible to obtain the first data file; and
initiating a registration process to register the first user to obtain the first data file, if the first user is eligible to obtain the first data file.

12. The method of claim 9, further comprising:
generating a virtual sub-environment within the virtual environment, wherein the virtual sub-environment provides the first user a virtual experience associated with one or more products associated with the selected at least one product type.

13. The method of claim 9, wherein:
the selected experience theme comprises a plurality of products associated with the selected at least one product type;
a second product associated with the selected at least one product type can be obtained by the first user by transferring a second amount of data objects to a second entity that provides the second product; and
further comprising:
determining a third data file that provides a second benefit count to the first user when the second amount of data objects is transferred from the third data file to a fourth data file of the second entity to obtain the second product associated with the selected at least one product type, wherein the first benefit count is larger than the second benefit count; and
indicating to the first user in the virtual environment that the third data file provides the second benefit count to the first user in relation to obtaining the second product associated with the selected at least one product type, wherein the indication comprises the second benefit count.

14. The method of claim 13, further comprising:
determining that the first data file provides a third benefit count to the first user when the second number of data objects is transferred from the first data file to the fourth data file of the second entity to obtain the second product associated with the selected at least one product type, wherein the first benefit count is larger than the third benefit count; and
indicating to the first user in the virtual environment that the first data file provides the third benefit count to the first user in relation to obtaining the second product associated with the selected at least one product type, wherein the indication comprises the third benefit count.

15. The method of claim 9, further comprising:
determining that a third data file provides a second benefit count to the first user when the first amount of data objects is transferred from the third data file to the second data file associated with the first entity to obtain the first product associated with the selected at least one product type, wherein the first benefit count is larger than the second benefit count; and
indicating to the first user in the virtual environment that the third data file provides the second benefit count to the first user in relation to obtaining the first product associated with the selected at least one product type, wherein the indication comprises the second benefit count.

16. The method of claim 9, wherein:
the second selection of the at least one product type comprises:
a third selection of a first product type; and
a fourth selection of a second product type; and
further comprising:
generating a virtual sub-environment within the virtual environment, wherein the virtual sub-environment provides the first user a virtual experience associated with at least one product associated with the first product type and at least one product associated with the second product type.

17. A non-transitory computer-readable medium that stores instructions which when executed by a processor causes the processor to:
- receive a user credential associated with the first user, wherein the user credential provides the first user access to a virtual environment;
- authorize, based on the user credential, an avatar of the first user to enter the virtual environment;
- receive a first selection made by the first user of an experience theme using the avatar in the virtual environment, wherein the experience theme comprises a plurality of selectable product types;
- receive a second selection made by the first user in the virtual environment of at least one product type from the selected experience theme, wherein a first product associated with the selected at least one product type can be obtained by the first user by transferring a first amount of data objects to a first entity that provides the first product;
- determine a first data file that provides a first benefit count to the first user when the first amount of data objects is transferred from the first data file to a second data file associated with the first entity to obtain the first product associated with the selected at least one product type;
- indicate to the first user in the virtual environment that the first data file provides the first benefit count to the first user in relation to obtaining the first product associated with the selected at least one product type, wherein the indication comprises the first benefit count;
- receive a command from the first user to register to obtain the first data file; and
- in response to receiving the command, initiate a registration process to register the first user to obtain the first data file.

18. The non-transitory computer-readable medium of claim 17, wherein the instructions further cause the processor to:
- after the user has obtained the first data file, receive a second command from the first user to transfer the first amount of data objects from the first data file to the second data file associated with the entity to obtain the first product; and
- in response to receiving the second command, transfer the first amount of data objects from the first data file to the second data file, to cause a transfer of the first product to the first user in a real-world environment.

19. The non-transitory computer-readable medium of claim 18, wherein the instructions further cause the processor to:
- determine whether the first user is registered with a second entity associated with the virtual environment;
- if the first user is not registered with the second entity, obtain a user profile of the first user associated with the user credential of the first user;
- determine, based on the user profile, whether the first user is eligible to obtain the first data file; and
- initiate a registration process to register the first user to obtain the first data file, if the first user is eligible to obtain the first data file.

20. The non-transitory computer-readable medium of claim 17, wherein the instructions further cause the processor to:
- generate a virtual sub-environment within the virtual environment, wherein the virtual sub-environment provides the first user a virtual experience associated with one or more products associated with the selected at least one product type.

* * * * *